United States Patent
Gossett et al.

(10) Patent No.: US 12,462,262 B2
(45) Date of Patent: Nov. 4, 2025

(54) DE-IDENTIFIED SEARCH OF PART DESIGNS

(71) Applicant: SYBRIDGE TECHNOLOGIES U.S. INC, Southfield, MI (US)

(72) Inventors: Timothy Charles Gossett, Marietta, GA (US); Gustavo Teixeira Pinto, Parkland, FL (US); Charles David Wood, Highland Park, IL (US); Davis James McGregor, Chicago, IL (US); William Paul King, Champaign, IL (US)

(73) Assignee: SyBridge Technologies U.S. Inc., Southfield, MI (US)

( * ) Notice: Subject to any disclaimer, the term of this patent is extended or adjusted under 35 U.S.C. 154(b) by 265 days.

(21) Appl. No.: 18/446,804

(22) Filed: Aug. 9, 2023

(65) Prior Publication Data
US 2025/0053541 A1    Feb. 13, 2025

(51) Int. Cl.
| | |
|---|---|
| G06F 16/14 | (2019.01) |
| G06F 21/60 | (2013.01) |
| G06F 30/17 | (2020.01) |
| G06Q 30/018 | (2023.01) |
| G06Q 50/04 | (2012.01) |
| G06Q 50/18 | (2012.01) |
| H04L 9/06 | (2006.01) |

(52) U.S. Cl.
CPC ......... G06Q 30/018 (2013.01); G06F 16/148 (2019.01); G06F 21/602 (2013.01); G06F 30/17 (2020.01); G06Q 50/04 (2013.01); G06Q 50/184 (2013.01); H04L 9/0643 (2013.01)

(58) Field of Classification Search
CPC .. G06Q 30/018; G06Q 50/184; G06F 16/148; G06F 16/152
See application file for complete search history.

(56) References Cited

U.S. PATENT DOCUMENTS

| | | | | |
|---|---|---|---|---|
| 2009/0054157 | A1* | 2/2009 | Hamilton, II | A63F 13/57 463/43 |
| 2013/0238393 | A1* | 9/2013 | Raichelgauz | G06N 5/02 705/7.29 |

(Continued)

OTHER PUBLICATIONS

Wikipedia | "SHA-2." Wikipedia article, last accessed Aug. 9, 2023, 9 pages.

*Primary Examiner* — Ponnoreay Pich
(74) *Attorney, Agent, or Firm* — McDonnell Boehnen Hulbert & Berghoff LLP

(57) ABSTRACT

Systems/techniques that facilitate de-identified search of part designs are provided. In various embodiments, a system can access a part design file provided by a client device, wherein the part design file can comprise a computer-aided design (CAD) geometry of a part. In various aspects, the system can search an historical database for a same or similar instance of the part, via performance of a multi-staged search. In various instances, the multi-staged search can be based on a cryptographic hash of the part design file, on a spatial hash of the CAD geometry, and on an anonymized feature vector extracted from the CAD geometry. In various cases, the system can return, to the client device and in response to the multi-staged search, an electronic notification indicating whether the same or similar instance of the part was identified.

20 Claims, 19 Drawing Sheets

(56) References Cited

U.S. PATENT DOCUMENTS

2022/0058198 A1\* 2/2022 Dupont ................ G06F 21/602
2025/0053541 A1\* 2/2025 Gossett ................ G06F 16/148
2025/0053998 A1\* 2/2025 Gossett ................ G06Q 50/184

\* cited by examiner

DE-IDENTIFIED SEARCH OF PART DESIGNS

BACKGROUND

The subject disclosure relates generally to contract manufacturing, and more specifically to de-identified search of part designs.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate de-identified search of part designs are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a part design file provided by a client device, wherein the part design file can comprise a computer-aided design (CAD) geometry of a part. In various aspects, the computer-executable components can comprise a search component that can search an historical database for a same or similar instance of the part, via performance of a multi-staged search. In various instances, the multi-staged search can be based on a cryptographic hash of the part design file, on a spatial hash of the CAD geometry, and on an anonymized feature vector extracted from the CAD geometry. In various cases, the computer-executable components can comprise a result component that can return, to the client device and in response to the multi-staged search, an electronic notification indicating whether the same or similar instance of the part was identified.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a part design file provided by a client device, wherein the part design file can comprise a computer-aided design (CAD) geometry of a part. In various aspects, the computer-executable components can comprise a search component that can determine whether the part design file is subject to any manufacturing restrictions, via performance of a multi-staged search of an historical database. In various instances, the multi-staged search can be based on a cryptographic hash of the part design file, on a spatial hash of the CAD geometry, and on an anonymized feature vector extracted from the CAD geometry. In various cases, the computer-executable components can comprise a result component that can return, to the client device and in response to the multi-staged search, an electronic notification indicating whether the part design file is subject to any manufacturing restrictions.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a part design file provided by a client device and subject to a manufacturing restriction, wherein the part design file can comprise a computer-aided design (CAD) geometry of a restricted part. In various aspects, the computer-executable components can comprise a search component that can determine whether the restricted part has previously been fabricated at the manufacturing facility, via performance of a multi-staged search of an historical database. In various instances, the multi-staged search can be based on a cryptographic hash of the part design file, on a spatial hash of the CAD geometry, and on an anonymized feature vector extracted from the CAD geometry. In various cases, the computer-executable components can comprise a result component that can return, to the client device and in response to the multi-staged search, an electronic notification indicating whether the restricted part has previously been fabricated at the manufacturing facility in violation of the manufacturing restriction.

In various embodiments, the above-described systems can be implemented as computer-implemented methods or computer program products.

DETAILED DESCRIPTION

Figure 1:
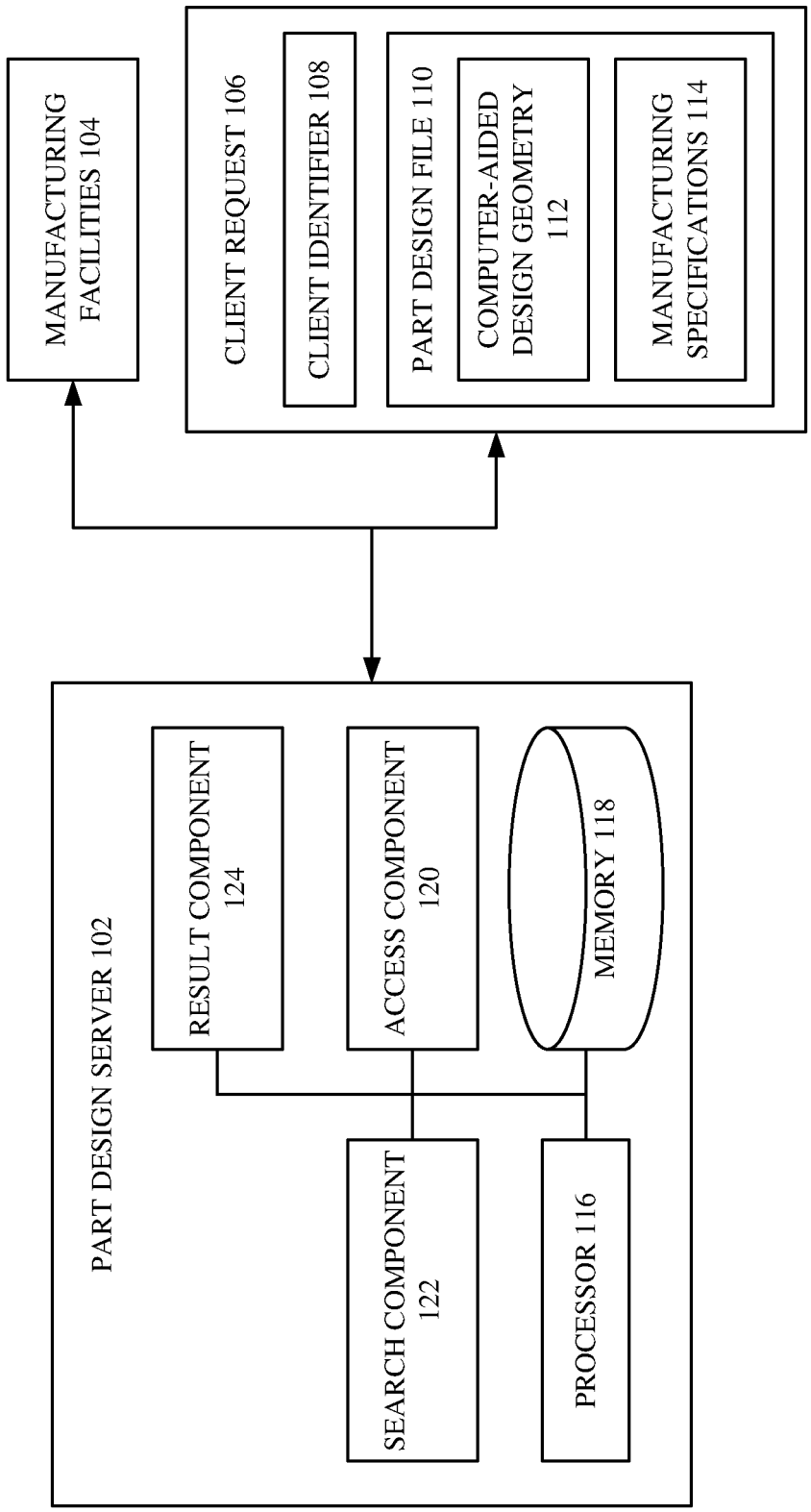
FIG. 1 illustrates a block diagram of an example, non-limiting system that facilitates de-identified search of part designs in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Contract manufacturing can be considered as an industrial field in which manufacturers (e.g., owners or operators of manufacturing facilities or factories) can provide manufacturing services to customers. For example, a customer can design a part (e.g., can design any suitable tangible, structural, or physical product or portion thereof) and can provide a manufacturer with such part design. Usually, the part design can be formatted as a computer-aided design (CAD) file (e.g., a SolidWorks® file, an AutoCAD® file) that can electronically represent a three-dimensional geometry of the part. However, the part design can instead be in any other suitable format, such as two-dimensional drawings or images (e.g., top, front, side, isometric, cross-sectional, or cut-away views) of the part. In some instances, the part design can include instructions governing how the part should be manufactured (e.g., can include tolerances to be obeyed, materials to be used, surface finishes to be applied, or manufacturing processes to be implemented). In any case, the manufacturer can manufacture or fabricate the part (also referred to herein as fulfilling the part) according to the part design, and the manufacturer can deliver or otherwise provide the part to the customer.

Advances in digital design software tools, digital manufacturing software tools, factory automation, and additive manufacturing have accelerated the implementation of computerized systems in contract manufacturing. Indeed, such advances can allow customers to rapidly generate very large numbers of part designs and can allow manufacturers to just as rapidly fabricate or produce parts according to those part designs at scale. Moreover, such advances can allow manufacturers to fulfill such voluminous part designs with little to no human intervention (e.g., in a fully-automated or nearly-fully-automated fashion).

Such voluminous part designs can be electronically stored or otherwise maintained in any suitable databases. For instance, a client can have a database that stores or maintains whatever part designs that the client has previously created. In another instance, a manufacturer can have a database that stores or maintains whatever part designs that the manufacturer has previously fulfilled.

When given a part design, it can be desired to search through a database of previous part designs, so as to obtain manufacturing insights. For instance, if the given part design is the same as or similar to a previous part design, then it can be concluded that same or similar manufacturing processes can be applied to the given part design as were applied to the previous part design. However, part designs can often be considered as sensitive, classified, proprietary, or otherwise private. Accordingly, if a customer creates a part design to be fulfilled by a manufacturer, that customer can desire that unauthorized entities (e.g., other customers, other manufacturers, third-parties) be prevented from viewing or reading the part design. These conflicting interests can be considered as amounting to a technical problem in the field of contract manufacturing: how to configure databases to allow searching or comparison of part designs while simultaneously preserving the privacy of part designs.

Various embodiments described herein can address this technical problem. One or more embodiments described herein can include systems, computer-implemented methods, apparatus, or computer program products that can facilitate de-identified search of part designs. In other words, the inventors of various embodiments described herein devised various techniques that allow part designs to be searched or compared in a privacy-preserving fashion. In particular, various embodiments described herein can involve converting or transforming a part design into one or more secondary electronic files via one or more privacy-preserving functions (e.g., hashing functions, scrambling functions, machine learning encoders). Such one or more secondary electronic files can be considered as representing key attributes of the part design, but in such a way that the part design itself cannot be reconstructed, reverse-engineered, or inferred from the one or more secondary electronic files alone by an entity that does not know the one or more specific privacy-preserving functions that were utilized. Accordingly, rather than comparing two different part designs directly to obtain insights, the secondary electronic files of those two different part designs can instead be compared to obtain insights. Thus, a database can store such secondary electronic files, and searches can be performed through such database without having access to the underlying part designs from which those secondary electronic files were derived. In this way, key attributes or characteristics of part designs can be effectively searched or compared with each other, without those part designs being non-private (e.g., being actually available for viewing or reading by unauthorized entities).

Various embodiments described herein can be considered as a computerized tool (e.g., any suitable combination of computer-executable hardware or computer-executable software) that can facilitate de-identified search of part designs. In various aspects, such computerized tool can comprise an access component, a search component, or a result component.

In various embodiments, there can be one or more manufacturing facilities. In various aspects, the one or more manufacturing facilities can be any suitable factories that can implement any suitable automated manufacturing processes (e.g., automated additive manufacturing processes, automated assembly line manufacturing processes) so as to fabricate any suitable parts.

In various embodiments, there can be a client request. In various aspects, the client request can be any suitable electronic data that can be generated by or transmitted from a computing device operated by or otherwise associated with a client. In various instances, the client request can comprise a client identifier. In various cases, the client identifier can be any suitable alphanumeric identifier that is unique or distinctive to the client. In various aspects, the client request can comprise a part design file. In various instances, the part design file can be any suitable electronic data that describes or characterizes an engineering design of a part. In particular, the part design file can, in various cases, comprise a CAD geometry that can electronically represent how the part is shaped, contoured, or physically arranged in three-space. Moreover, the part design file can, in various aspects, comprise one or more manufacturing specifications that can stipulate how the part is to be fabricated (e.g., that can specify materials, tolerances, surface finishes, or manufacturing processes for the part).

In some instances, the client request can be considered as a request that the part be manufactured or fabricated by the one or more manufacturing facilities. In such cases, before such a request is fulfilled by the one or more manufacturing facilities, it can be desirable to first determine whether or not the part is subject to or violative of any applicable manufacturing restrictions, such as intellectual property restrictions or governmental security restrictions.

In other instances, the client request can be considered as an inquiry regarding which manufacturing processes would or should be implemented or which manufacturing costs would or should be incurred if the part were to be fabricated by the one or more manufacturing facilities. In such cases, it can be desirable to determine whether or not the part or a similar part has previously been fabricated by the one or more manufacturing facilities, so that the manufacturing processes or costs of such prior fabrications can be recalled.

In yet other instances, the part described or characterized by the part design file can be considered as a restricted part that is known to be subject to a manufacturing restriction (e.g., subject to an intellectual property restriction or to a governmental security restriction). In such case, it can be desirable to determine whether or not the one or more manufacturing facilities violated this manufacturing restriction in the past by previously fabricating the part or a similar part.

In various aspects, the computerized tool can facilitate any of such determinations in a privacy-preserving fashion, as described herein.

In various embodiments, the access component of the computerized tool can electronically receive or otherwise electronically access the client request. In some aspects, the access component can electronically receive the client request directly from the computing device of the client. In other aspects, the access component can electronically retrieve the client request from any suitable centralized or decentralized data structures (e.g., graph data structures, relational data structures, hybrid data structures), whether remote from or local to the access component. In any case, the access component can electronically obtain or access the client request, such that other components of the computerized tool can electronically interact with (e.g., read, write, edit, copy, manipulate) the client request.

In various embodiments, the search component of the computerized tool can electronically maintain, control, or otherwise access an historical database. To address any of the above-mentioned determinations, the search component can, in various aspects, electronically perform a multi-staged search through the historical database. In various instances, the multi-staged search can be based on the client request. In particular, the multi-staged search can be based on a cryptographic hash derived from the part design file, on a spatial hash derived from the CAD geometry, and on an anonymized feature vector derived from the CAD geometry.

In various aspects, the search component can generate the cryptographic hash by applying any suitable cryptographic hashing function (e.g., SHA-256) to the part design file (e.g., to both the CAD geometry and to the one or more manufacturing specifications). More specifically, the search component can convert the part design file into a textual format (e.g., via any suitable .DWG to .TXT conversion techniques), and the search component can feed such textual format to the cryptographic hashing function, thereby yielding the cryptographic hash. In various instances, the cryptographic hashing function can be any suitable mathematical function that can receive one-dimensional, arbitrary-length inputs (e.g., such as text files) and that can produce one-dimensional, fixed-length outputs that are unique to respective inputs. Furthermore, without knowing the cryptographic hashing function, one cannot accurately or reliably infer what specific one-dimensional, arbitrary-length input corresponds to any given one-dimensional, fixed-length output. That is, the cryptographic hashing function can be one-way. Accordingly, the cryptographic hash can be considered as a de-identified, fixed-length string that uniquely represents the part design file. In other words, the cryptographic hash can be considered as a private signature or fingerprint that uniquely corresponds to the part design file.

In various aspects, the search component can generate the spatial hash by applying any suitable spatial hashing function (e.g., perceptual hashing) to the CAD geometry (e.g., not to the one or more manufacturing specifications). More specifically, the search component can feed the three-dimensional volume represented by the CAD geometry, or can feed two-dimensional projections thereof, to the spatial hashing function, thereby yielding the spatial hash. In various instances, the spatial hashing function can be any suitable mathematical function that can receive two-dimensional or three-dimensional, arbitrary-length inputs (e.g., such as geometric volumes or projections of geometric volumes) and that can produce one-dimensional, fixed-length outputs that are unique to respective inputs. Similar to a cryptographic hashing function, a spatial hashing function can be one-way. That is, without knowing the spatial hashing function, one cannot accurately or reliably infer what specific two-dimensional or three-dimensional, arbitrary-length input corresponds to any given one-dimensional, fixed-length output. Accordingly, the spatial hash can be considered as a de-identified, fixed-length string that uniquely represents the CAD geometry. In other words, the spatial hash can be considered as a private signature or fingerprint that uniquely corresponds to the CAD geometry.

In various aspects, the anonymized feature vector can be any suitable electronic data having any suitable format, size, or dimensionality that is smaller (e.g., many orders of magnitude smaller, in some cases) than that of the CAD geometry and that can be considered as representing or conveying (albeit in a hidden or non-apparent way) substantive attributes or properties of the CAD geometry. In other words, the anonymized feature vector can be considered as an embedded or latent vector representation of the CAD geometry.

In some instances, the search component can generate the anonymized feature vector deterministically. For example, the search component can read the CAD geometry and can extract, via such reading, any suitable spatial properties (e.g., shapes, orientations, lengths, widths, heights, thicknesses, diameters, radii of curvature, taper rates) of the CAD geometry. The search component can concatenate such extracted spatial properties together, and such concatenation can be referred to as a feature vector. Moreover, the search component can apply any suitable scrambling function to such feature vector, thereby yielding the anonymized feature vector. Note that the scrambling function can be one-way. That is, without knowing the scrambling function, one cannot accurately or reliably infer the specific spatial properties of the CAD geometry by considering the anonymized feature vector alone (hence the term "anonymized").

In other instances, the search component can generate the anonymized feature vector via machine learning. For example, the search component can store, maintain, control, or otherwise access a deep learning neural network. In various aspects, the deep learning neural network can exhibit any suitable internal architecture and can have been trained as an encoder in an encoder-decoder deep learning pipeline. Accordingly, the deep learning neural network can be configured to compress, embed, or encode CAD geometries into anonymized feature vectors. More specifically, the search component can feed the CAD geometry to an input layer of the deep learning neural network, the CAD geometry can complete a forward pass through one or more hidden layers of the deep learning neural network, and an output layer of the deep learning neural network can compute the anonymized feature vector based on activations from the one or more hidden layers. In such cases, the anonymized feature vector can be considered as conveying or representing (albeit in an unclear or obfuscated way) whatever spatial attributes of the CAD geometry that the deep learning neural network has learned to recognize via its training. Moreover, the deep learning neural network can be one-way. That is, without knowing the specific internal parameters (e.g., weight matrices, bias values, convolutional kernels) of the deep learning neural network or the decoder with which the deep learning neural network was trained, one cannot accurately or reliably infer the specific spatial properties of the CAD geometry by considering the anonymized feature vector alone (again, hence the term "anonymized").

In various aspects, the one or more manufacturing facilities can have fulfilled any suitable number of previous part design files in the past. In various instances, the historical database can store, maintain, or otherwise contain cryptographic hashes, spatial hashes, and anonymized feature vectors derived from those previous part design files. In particular, the historical database can, in various cases, comprise any suitable number of prior cryptographic hashes, which the search component can have respectively derived (just as described above) from those previous part design files. Likewise, the historical database can, in various aspects, comprise any suitable number of prior spatial hashes, which the search component can have respectively derived (just as described above) from CAD geometries of those previous part design files. Similarly, the historical database can, in various aspects, comprise any suitable number of prior anonymized feature vectors, which the search component can have respectively extracted (just as described above) from the CAD geometries of those previous part design files.

In various aspects, it can be possible that two or more previous part design files had the same CAD geometries as each other (e.g., same CAD geometries with different manufacturing specifications). In such cases, those two or more previous part design files can be considered as having the same prior spatial hashes and the same prior anonymized feature vectors as each other (e.g., since spatial hashes and anonymized feature vectors can be dependent upon CAD geometry and can be independent of manufacturing specifications). Accordingly, for each distinct or unique prior spatial hash in the historical database, that prior spatial hash can be considered as corresponding to one distinct or unique prior anonymized feature vector and as corresponding to one or more distinct or unique prior cryptographic hashes. In other words, the historical database can be considered as comprising a set of prior spatial hashes, a set of prior anonymized feature vectors that respectively correspond to the set of prior spatial hashes (e.g., one prior anonymized feature vector per prior spatial hash), and a set of groups of prior cryptographic hashes that respectively correspond to the set of prior spatial hashes (e.g., one group of prior cryptographic hashes per prior spatial hash).

In various instances, the historical database can further comprise a set of manufacturing restriction indicators that respectively correspond to the set of prior spatial hashes (e.g., one manufacturing restriction indicator per prior spatial hash, and thus per group of prior cryptographic hashes or per prior anonymized feature vector). In various cases, a manufacturing restriction indicator can be any suitable electronic data having any suitable format, size, or dimensionality, and that can indicate, represent, or otherwise convey what type of manufacturing restriction, if any, is known or deemed to apply to any given prior spatial hash (and thus to any given prior anonymized feature vector and to any given group of prior cryptographic hashes).

As an example, suppose that a particular prior spatial hash, a particular prior anonymized feature vector, and a particular group of prior cryptographic hashes correspond to a particular manufacturing restriction indicator. In some cases, that particular manufacturing restriction indicator can specify an intellectual property restriction (e.g., patent restriction, trade secret restriction), which can prohibit the manufacture or fabrication of a part in accordance with that particular prior spatial hash, with that particular prior anonymized feature vector, or with that particular group of prior cryptographic hashes, for one or more delineated entities (e.g., manufacturing or fabrication of such part can be permitted only on behalf of a known owner or of known licensees associated with the intellectual property restriction). In other cases, that particular manufacturing restriction indicator can specify a governmental security restriction (e.g., internal traffic in arms regulation), which can prohibit the manufacture or fabrication of a part in accordance with that particular prior spatial hash, with that particular prior anonymized feature vector, or with that particular group of prior cryptographic hashes, for one or more delineated entities (e.g., manufacturing or fabrication of such part can be permitted only on behalf of known governmental entities and can be prohibited for known foreign or hostile entities). In yet other cases, that particular manufacturing restriction indicator can specify no manufacturing restriction at all. In such case, the manufacture or fabrication of a part in accordance with that particular prior spatial hash, with that particular prior anonymized feature vector, or with that particular group of prior cryptographic hashes can be permitted for or on behalf of any entities.

In various aspects, the historical database can further comprise a set of build packages that respectively correspond to the set of prior spatial hashes (e.g., one build package per prior spatial hash, and thus per group of prior cryptographic hashes or per prior anonymized feature vector). In various cases, a build package can be any suitable electronic data having any suitable format, size, or dimensionality, and that can indicate, represent, or otherwise convey any manufacturing records associated with any given prior spatial hash (and thus with any given prior anonymized feature vector and with any given group of prior cryptographic hashes). For example, suppose that a particular prior spatial hash, a particular prior anonymized feature vector, and a particular group of prior cryptographic hashes correspond to a particular build package. In various instances, the particular build package can indicate that a part was previously manufactured or fabricated in accordance with the particular prior spatial hash, with the particular prior anonymized feature vector, or with the particular group of prior cryptographic hashes. Moreover, the particular build package can specify any suitable information regarding how, why, when, or where that part was previously manufactured or fabricated. For instance, the particular build package can specify: one or more costs that were incurred in previously manufacturing that part; one or more manufacturing processes (e.g., casting, extrusion, 3D printing) that were utilized in previously manufacturing that part; which specific manufacturing facility handled the previous manufacturing of that part; one or more materials that were used to previously manufacture that part; one or more surface finishes that were used to previously manufacture that part; one or more scrap rates that were implemented in previously manufacturing that part; one or more obstacles that were encountered during previous manufacturing of that part; or one or more engineering analyses or tests that were conducted during previous manufacturing of that part.

In any case, as mentioned above, the search component can perform a multi-staged search through the historical database, where such multi-staged search can be based on the cryptographic hash, on the spatial hash, and on the anonymized feature vector derived from the part design file provided in the client request. In various aspects, such multi-staged search can help to facilitate any suitable determinations regarding the part design file. Moreover, in various instances, the result component of the computerized tool can facilitate any suitable electronic actions based on the multi-staged search.

As a non-limiting example, suppose that the client request is a manufacturing or fabrication order that asks that a part be manufactured by the one or more manufacturing facilities in accordance with the part design file specified in the client request. As mentioned above, prior to fulfilling that request, it can be desirable to first determine whether or not the part design file is subject to or violative of any known manufacturing restrictions. In various aspects, the multi-staged search through the historical database can facilitate such determination. In particular, the multi-staged search can be conducted as follows.

In various cases, the search component can generate the cryptographic hash from the part design file, and the search component can search through the historical database for that cryptographic hash. If that cryptographic hash is already present in the historical database (e.g., if the exact same part design file has been previously encountered), the search component can identify whichever manufacturing restriction indicator in the historical database corresponds to the cryptographic hash. In some instances, that manufacturing restriction indicator can specify no manufacturing restriction at all or can specify a manufacturing restriction that does not apply to or otherwise constrain the client identifier. In such cases, it can be concluded that it is permissible to manufacture or fabricate the part on behalf of the client. Thus, the result component can instruct the one or more manufacturing facilities to fulfill the part design file (e.g., to fabricate or schedule for fabrication the part). In other instances, however, that manufacturing restriction indicator can instead specify a manufacturing restriction that does apply to or otherwise constrain the client identifier. In such cases, it can be concluded that it is not permissible to manufacture or fabricate the part on behalf of the client. Thus, the result component can instruct the one or more manufacturing facilities to refrain from fulfilling the part design file.

Now, if that cryptographic hash is not already present in the historical database (e.g., if the exact same part design file has not previously been encountered), the search component can generate the spatial hash from the CAD geometry of the part design file, and the search component can search through the historical database for that spatial hash. If that spatial hash is already present in the historical database (e.g., if the exact same CAD geometry has previously been encountered), the search component can identify whichever manufacturing restriction indicator already corresponds to the spatial hash, and the result component can act accordingly (e.g., can instruct the one or more manufacturing facilities to fulfill or refrain from fulfilling the part, based on the identified manufacturing restriction indicator).

Next, if that spatial hash is not already present in the historical database (e.g., if the exact same CAD geometry has not previously been encountered), the search component can extract the anonymized feature vector from the CAD geometry of the part design file, and the search component can search through the prior anonymized feature vectors in the historical database. If that anonymized feature vector is within any suitable threshold level of similarity (e.g., as measured via cosine similarity or Euclidean distance) to one or more prior anonymized feature vectors in the historical database, the search component can identify whichever manufacturing restriction indicators already correspond to those similar anonymized feature vectors, and the result component can act accordingly (e.g., can instruct the one or more manufacturing facilities to fulfill or refrain from fulfilling the part, based on the identified manufacturing restriction indicators). Instead, if that anonymized feature vector is not within the threshold level of similarity to any prior anonymized feature vector, it can be concluded that no manufacturing restrictions are applicable to the part design file. Accordingly, the result component can instruct the one or more manufacturing facilities to fulfill the part design file.

In this way, the multi-staged search can facilitate determining whether or not the part design file is subject to a known manufacturing restriction, without having access to any of the previous part design files that have been fulfilled by the one or more manufacturing facilities (e.g., the multi-staged search can be conducted in a de-identified fashion).

As another non-limiting example, suppose that the client request is a prospective inquiry that asks what kinds of manufacturing processes or manufacturing costs would be involved if a part were to be manufactured by the one or more manufacturing facilities in accordance with the part design file specified in the client request. As mentioned above, before answering such inquiry, it can be desirable to first determine whether or not a same or similar instance of the part design file has previously been fulfilled by the one or more manufacturing facilities. In various aspects, the multi-staged search through the historical database can facilitate such determination. In particular, the multi-staged search can be conducted as follows.

In various cases, the search component can generate the cryptographic hash from the part design file, and the search component can search through the historical database for that cryptographic hash. If that cryptographic hash is already present in the historical database (e.g., if the exact same part design file has been previously encountered), the search component can identify whichever build package in the historical database corresponds to the cryptographic hash. That identified build package can be considered as indicating or specifying various records that were involved in manufacturing that same part design file in the past (e.g., costs incurred, processes implemented, analyses conducted). Accordingly, that identified build package can be considered as answering the client request, and so the result component can forward that identified build package, or a portion thereof, to the client.

Now, if that cryptographic hash is not already present in the historical database (e.g., if the exact same part design file has not previously been encountered), the search component can generate the spatial hash from the CAD geometry of the part design file, and the search component can search through the historical database for that spatial hash. If that spatial hash is already present in the historical database (e.g., if the exact same CAD geometry has previously been encountered), the search component can identify whichever build package already corresponds to the spatial hash, and the result component can act accordingly (e.g., can forward the build package to the client).

Next, if that spatial hash is not already present in the historical database (e.g., if the exact same CAD geometry has not previously been encountered), the search component can extract the anonymized feature vector from the CAD geometry of the part design file, and the search component can search through the prior anonymized feature vectors in the historical database. If that anonymized feature vector is with any suitable threshold level of similarity (e.g., as measured via cosine similarity or Euclidean distance) to one or more prior anonymized feature vectors in the historical database, the search component can identify whichever build packages already correspond to those similar anonymized feature vectors, and the result component can act accordingly (e.g., can forward those build packages to the client). Instead, if that anonymized feature vector is not within the threshold level of similarity to any prior anonymized feature vector, it can be concluded that no build package has previously been prepared for the part design file or anything similar to the part design file. Accordingly, the result component can respond to the client request by indicating that a customized or new build package is warranted.

In this way, the multi-staged search can facilitate determining what manufacturing processes or costs might be involved if the part design file were to be fulfilled, without having access to any of the previous part design files that have been fulfilled by the one or more manufacturing facilities (e.g., the multi-staged search can be conducted in a de-identified fashion).

As yet another non-limiting example, suppose that the part design file is already known to be subject to a manufacturing restriction. In such case, the client request can be a retrospective inquiry that asks whether the one or more manufacturing facilities potentially violated the manufacturing restriction by previously fulfilling the part design file or anything similar to the part design file. In various aspects, the multi-staged search through the historical database can facilitate such determination. In particular, the multi-staged search can be conducted as follows.

In various cases, the search component can generate the cryptographic hash from the part design file, and the search component can search through the historical database for that cryptographic hash. If that cryptographic hash is already present in the historical database, it can be concluded that the exact same part design file has been previously fulfilled by the one or more manufacturing facilities. Accordingly, the result component can inform the client that the manufacturing restriction has potentially been violated.

Now, if that cryptographic hash is not already present in the historical database (e.g., if the exact same part design file has not previously been encountered), the search component can generate the spatial hash from the CAD geometry of the part design file, and the search component can search through the historical database for that spatial hash. If that spatial hash is already present in the historical database, it can be concluded that the exact same CAD geometry has previously been fulfilled by the one or more manufacturing facilities. Thus, the result component can inform the client that the manufacturing restriction has potentially been violated.

If that spatial hash is not already present in the historical database (e.g., if the exact same CAD geometry has not previously been encountered), the search component can extract the anonymized feature vector from the CAD geometry of the part design file, and the search component can search through the prior anonymized feature vectors in the historical database. If that anonymized feature vector is with any suitable threshold level of similarity (e.g., as measured via cosine similarity or Euclidean distance) to one or more prior anonymized feature vectors in the historical database, it can be concluded that something similar to the part design file has previously been fulfilled by the one or more manufacturing facilities. Accordingly, the result component can inform the client that the manufacturing restriction has potentially been violated. Instead, if that anonymized feature vector is not within the threshold level of similarity to any prior anonymized feature vector, it can be concluded that nothing similar to the part design file has previously been fulfilled by the one or more manufacturing facilities. So, the result component can inform the client that the manufacturing restriction has not been violated.

In this way, the multi-staged search can facilitate determining whether the manufacturing restriction known to be associated with the part design file has previously been violated, without having access to any of the previous part design files that have been fulfilled by the one or more manufacturing facilities (e.g., the multi-staged search can be conducted in a de-identified fashion).

Various embodiments described herein can be employed to use hardware or software to solve problems that are highly technical in nature (e.g., to facilitate de-identified search of part designs), that are not abstract and that cannot be performed as a set of mental acts by a human. Further, some of the processes performed can be performed by a specialized computer (e.g., cryptographic or spatial hashers, machine learning encoders) for carrying out defined acts related to part designs.

For example, such defined acts can include: accessing, by a server device operatively coupled to a processor, a part design file provided by a client device, wherein the part design file comprises a computer-aided design (CAD) geometry of a part; determining, by the server device, whether the part design file is subject to any manufacturing restrictions, via performance of a multi-staged search of an historical database, wherein the multi-staged search is based on a cryptographic hash of the part design file, is based on a spatial hash of the CAD geometry, and is based on an anonymized feature vector extracted from the CAD geometry; and returning, by the server device, to the client device, and in response to the multi-staged search, an electronic notification indicating whether the part design file is subject to any manufacturing restrictions.

As another example, such defined acts can include: accessing, by a server device operatively coupled to a processor, a part design file provided by a client device, wherein the part design file comprises a computer-aided design (CAD) geometry of a part; searching, by the server device, an historical database for a same or similar instance of the part, via performance of a multi-staged search, wherein the multi-staged search is based on a cryptographic hash of the part design file, is based on a spatial hash of the CAD geometry, and is based on an anonymized feature vector extracted from the CAD geometry; and returning, by the server device, to the client device, and in response to the multi-staged search, an electronic notification indicating whether the same or similar instance of the part was identified.

As even another example, such defined acts can include: accessing, by a server device associated with a manufacturing facility, a part design file provided by a client device and subject to a manufacturing restriction, wherein the part design file comprises a computer-aided design (CAD) geometry of a restricted part; determining, by the server device, whether the restricted part has previously been fabricated at the manufacturing facility, via performance of a multi-staged search of an historical database, wherein the multi-staged search is based on a cryptographic hash of the part design file, is based on a spatial hash of the CAD geometry, and is based on an anonymized feature vector extracted from the CAD geometry; and returning, by the server device, to the client device, and in response to the multi-staged search, an electronic notification indicating whether the restricted part has previously been fabricated at the manufacturing facility in violation of the manufacturing restriction.

Such defined acts are not performed manually by humans. Indeed, neither the human mind nor a human with pen and paper can electronically generate hashes or feature vectors of part design files and electronically search through a database using such hashes or feature vectors. Indeed, a part design file having a CAD geometry (e.g., SolidWorks® or AutoCAD® data) is an inherently-computerized construct that simply cannot be meaningfully implemented in any way by the human mind without computers. Furthermore, cryptographic/spatial hashes and feature vectors are also inherently-computerized constructs that simply cannot be meaningfully implemented outside of a computing environment. Further still, database searching is an established technical field concerned with how computerized databases can be efficiently and effectively searched. Database searching simply cannot be meaningfully implemented in any way by the human mind without computers. Accordingly, a computerized tool that can perform de-identified database searches of part design files by leveraging cryptographic/spatial hashes and feature vectors is likewise inherently-computerized and cannot be implemented in any sensible, practical, or reasonable way without computers.

Moreover, various embodiments described herein can integrate into a practical application various teachings relating to de-identified search of part designs. As explained above, advances in the field of contract manufacturing have allowed customers to rapidly create part designs and have allowed manufacturers to rapidly fulfill such part designs via automated manufacturing facilities. Such voluminous part designs can be stored in databases, and it can be desired to performed searches through such databases to obtain various manufacturing insights. However, part design files can be considered as sensitive or classified information, and so it can also be desired to protect part design files from being read or viewed by unauthorized entities. Thus, there can be a technical problem regarding how to configure a database of part design files to be searchable while also protecting the privacy of such part design files.

Various embodiments described herein can address this technical problem. Specifically, various embodiments described herein can involve generating cryptographic hashes of part design files, spatial hashes of CAD geometries specified in part design files, and anonymized feature vectors of CAD geometries specified in part design files. Rather than having a database of part design files, various embodiments described herein can instead have a database of such hashes and feature vectors. As described herein, such hashes and feature vectors can be considered as capturing or representing, in hidden or obfuscated fashion, key geometric information of respective part design files. Accordingly, such hashes and feature vectors can be searched or compared with each other, while their corresponding part design files can be unavailable. In other words, various embodiments described herein can treat such hashes and feature vectors as proxies for part design files. In this way, part design files can be effectively searched or compared, without risk (or with a significantly reduced risk) of those part design files being impermissibly read or viewed by unauthorized entities. For at least these reasons, various embodiments described herein certainly constitute concrete and tangible technical improvements in the field of contract manufacturing, and such embodiments therefore clearly qualify as useful and practical applications of computers.

Furthermore, various embodiments described herein can control real-world tangible devices based on the disclosed teachings. For example, various embodiments described herein can electronically instruct real-world automated manufacturing facilities (e.g., assembly lines, 3D printers) to power-on or to power-off based on results obtained via multi-staged searches.

It should be appreciated that the herein figures and description provide non-limiting examples of various embodiments and are not necessarily drawn to scale.

FIG. 1 illustrates a block diagram of an example, non-limiting system 100 that can facilitate de-identified search of part designs in accordance with one or more embodiments described herein. As shown, a part design server 102 can be electronically integrated, via any suitable wired or wireless electronic connections, with one or more manufacturing facilities 104 and with a client request 106.

In various embodiments, the one or more manufacturing facilities 104 can comprise any suitable number of manufacturing facilities. In various aspects, a manufacturing facility can be any suitable factory or portion thereof that can be equipped or outfitted with any suitable robotic actuators that can implement any suitable automated manufacturing processes. Non-limiting examples of such automated manufacturing processes can include automated assembly lines, automated additive manufacturing (e.g., 3D printing), computer numerically controlled machining, automated injection molding, automated rotational molding, automated casting, automated extrusion, automated forging, automated stamping, automated vacuum forming, automated bending, automated cutting, automated polishing, automated brazing, automated milling, automated grinding, automated broaching, automated welding, automated riveting, automated painting, automated dying, automated weaving, automated braiding, automated gluing, automated annealing, automated heat treating, or automated chemical treating. In various instances, the one or more manufacturing facilities 104 can be electronically controlled by, electronically commanded by, or otherwise in electronic communication with the part design server 102.

In various embodiments, the client request 106 can be any suitable electronic data that is generated or transmitted by any suitable computing device (not shown) in response to invocation by a client (not shown). That is, the client request 106 can be considered as being generated or transmitted at the behest or direction of the client. In various aspects, as shown, the client request 106 can comprise a client identifier 108. In various instances, the client identifier 108 can be one or more distinct or unique alphanumeric strings that can correspond to the client. In other words, the client identifier 108 can be considered as indicating, representing, or otherwise conveying an identity of the client.

In various cases, as also shown, the client request 106 can comprise a part design file 110. In various aspects, the part design file 110 can be any suitable electronic data that can describe, define, indicate, convey, or otherwise characterize an engineering design of a part. In particular, the part design file 110 can, as shown, comprise a computer-aided design geometry 112 (hereafter "CAD geometry 112") and one or more manufacturing specifications 114. In various instances, the CAD geometry 112 can be three-dimensional volume data that specifies, shows, or illustrates how the part is sized, shaped, or contoured in three-dimensional space. For example, the CAD geometry 112 can be a SolidWorks® document illustrating the part or an AutoCAD® document illustrating the part. However, in other instances, the CAD geometry 112 can instead be a plurality of two-dimensional images or drawings that respectively specify, show, or illustrate the part from a plurality of canonical perspectives or views. Non-limiting examples of such canonical perspectives or views can include a front view of the part, a side view of the part, a top view of the part, an isometric view of the part, a cross-sectional view of the part, or a cut-away view of the part. In various aspects, the one or more manufacturing specifications 114 can be any suitable electronic data that can specify, indicate, or otherwise convey non-geometric information regarding how the part (or any portions or sub-assemblies thereof) should be manufactured or fabricated. As some non-limiting examples, the one or more manufacturing specifications 114 can specify one or more materials (e.g., steel, iron, polymer) that the part should include or be composed of, one or more materials that the part should omit or not be composed of, one or more manufacturing processes (e.g., computer numerically controlled machining, injection molding, stamping, casting, extrusion, vacuum forming, bending, additive manufacturing, cutting, grinding, polishing, welding, brazing, painting, dying, weaving, braiding, gluing, annealing, heat treating) that should be utilized to fabricate the part, one or more manufacturing processes that should be avoided when fabricating the part, one or more surfaces finishes (e.g., roughness measures) that should be applied to the part, one or more surface finishes that should not be applied to the part, one or more coatings that should be applied to the part, one or more coatings that should not be applied to the part, one or more tolerances according to which the part should be fabricated, or one or more engineering analyses (e.g., stress and strain analysis, fatigue analysis, heat transfer analysis) that should be performed for the part.

Note that the part design file 110 can be in any suitable electronic format or formats. As a non-limiting example, the one or more manufacturing specifications 114 can be in a .TXT format (e.g., a text file format), whereas the CAD geometry 112 can be in a .DWG format (e.g., a drawing file format) or a .DAT format (e.g., a generic file format).

In some aspects, the client can be considered as a potential customer of the one or more manufacturing facilities 104, and the client request 106 can be considered or interpreted as a request that the part characterized by the part design file 110 be fabricated by the one or more manufacturing facilities 104. In such cases, prior to fulfilling such request by actually fabricating the part, it can be desirable to first determine whether or not fabrication of the part design file 110 would violate or infringe upon any known manufacturing restrictions.

In other aspects, the client can be considered as a potential customer of the one or more manufacturing facilities 104, and the client request 106 can be considered or interpreted as a prospective inquiry asking what costs might be incorporated if the part characterized by the part design file 110 were to be fabricated by the one or more manufacturing facilities 104. Relatedly, the client can be considered as a potential customer of the one or more manufacturing facilities 104, the one or more manufacturing specifications 114 can be absent or otherwise incomplete, and the client request 106 can be considered or interpreted as a prospective inquiry asking what manufacturing processes, analyses, materials, or tolerances should be implemented if the part characterized by the part design file 110 were to be fabricated by the one or more manufacturing facilities 104.

In yet other aspects, the part characterized by the part design file 110 can be known or deemed to be subject to a manufacturing restriction, and the client can be considered as an overseer, inspector, regulator, or restriction enforcer with respect to the one or more manufacturing facilities 104. In such case, the client request 106 can be considered or interpreted as a retrospective inquiry asking whether the one or more manufacturing facilities 104 violated or infringed upon the manufacturing restriction by previously fabricating the part or a similar part.

In any of these cases, the part design server 102 can help to facilitate such determinations or can help to answer such inquiries in a de-identified manner.

In various embodiments, the part design server 102 can comprise a processor 116 (e.g., computer processing unit, microprocessor) and a non-transitory computer-readable memory 118 that is operably or operatively or communicatively connected or coupled to the processor 116. The non-transitory computer-readable memory 118 can store computer-executable instructions which, upon execution by the processor 116, can cause the processor 116 or other components of the part design server 102 (e.g., access component 120, search component 122, result component 124) to perform one or more acts. In various embodiments, the non-transitory computer-readable memory 118 can store computer-executable components (e.g., access component 120, search component 122, result component 124), and the processor 116 can execute the computer-executable components.

In various embodiments, the part design server 102 can comprise an access component 120. In various aspects, the access component 120 can electronically receive or otherwise electronically access the client request 106. In various instances, the access component 120 can electronically receive the client request 106 directly from whichever computing device generated or transmitted the client request 106. However, in other instances, the access component 120 can electronically retrieve the client request 106 from any other computing devices (not shown), such as centralized or decentralized intermediary data structures. In any case, the access component 120 can electronically obtain or access the client request 106, such that other components of the part design server 102 can electronically interact with the client request 106.

In various embodiments, the part design server 102 can comprise a search component 122. In various aspects, as described herein, the search component 122 can facilitate any of the above-mentioned determinations or can answer any of the above-mentioned inquiries relating to the client request 106, by performing a multi-staged search of an historical database associated with the one or more manufacturing facilities 104.

In various embodiments, the part design server 102 can comprise a result component 124. In various instances, as described herein, the result component 124 can perform or initiate any suitable electronic actions, based upon completion of the multi-staged search.

Figure 2:
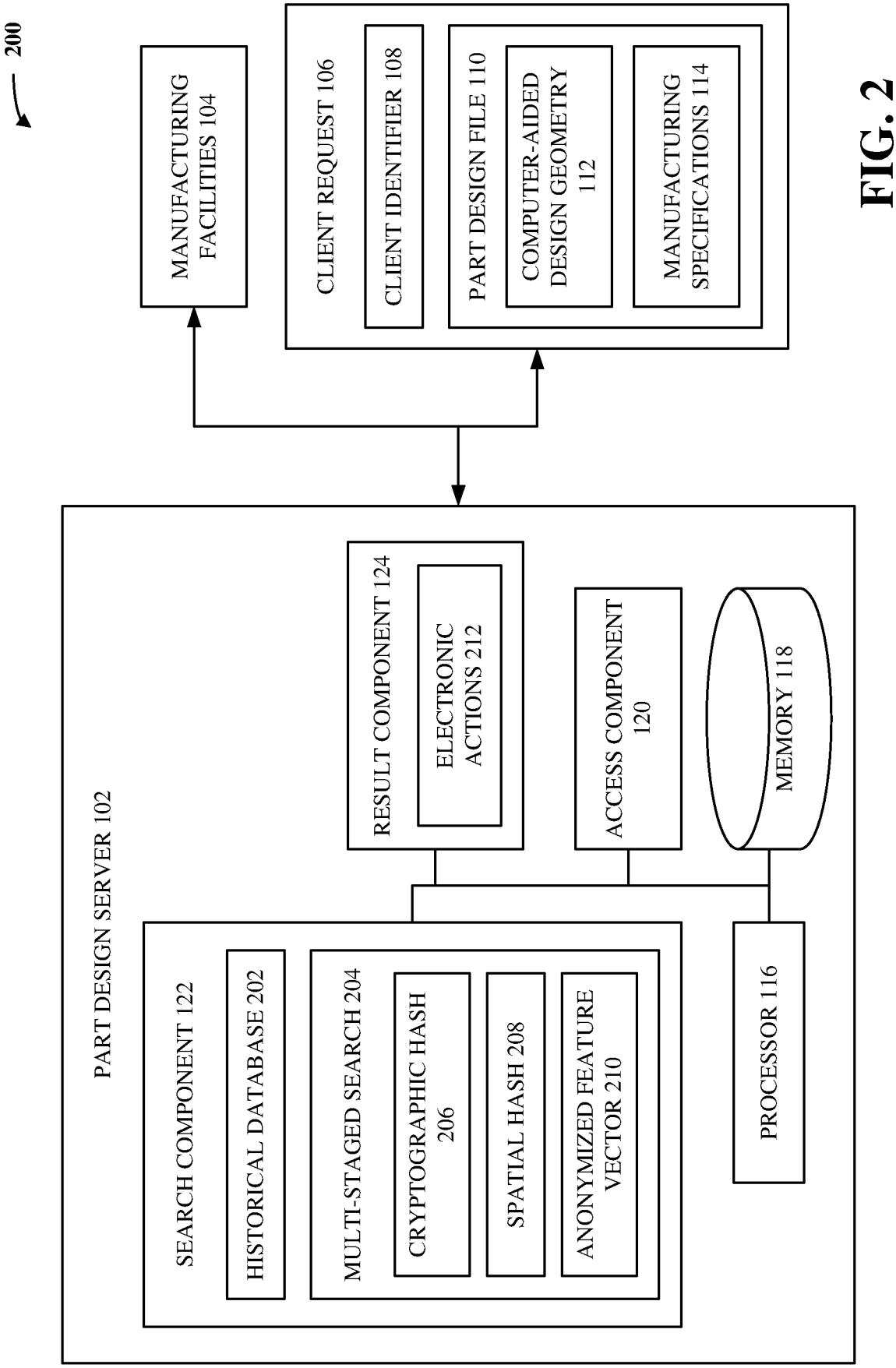
FIG. 2 illustrates a block diagram of an example, non-limiting system including an historical database and a multi-staged search that facilitates de-identified search of part designs in accordance with one or more embodiments described herein.

FIG. 2 illustrates a block diagram of an example, non-limiting system 200 including an historical database and a multi-staged search that can facilitate de-identified search of part designs in accordance with one or more embodiments described herein. As shown, the system 200 can, in some cases, comprise the same components as the system 100, and can further comprise an historical database 202, a multi-staged search 204, and one or more electronic actions 212.

In various embodiments, the search component 122 can electronically maintain, electronically control, or otherwise electronically access the historical database 202. As described further herein, the historical database 202 can electronically store various information pertaining to previous part design files that the one or more manufacturing facilities 104 fulfilled in the past but can refrain from electronically storing those previous part design files themselves.

In various aspects, the multi-staged search 204 can be considered as a specific type of search that the search component 122 can perform through or in the historical database 202. In various instances, the multi-staged search 204 can be based on the client request 106. More specifically, the multi-staged search 204 can be based on a cryptographic hash 206, on a spatial hash 208, and on an anonymized feature vector 210, each of which the search component 122 can electronically generate based on the client request 106. In various cases, the multi-staged search 204 can be considered as searching through the historical database 202 so as to identify or find previous part design files that the one or more manufacturing facilities 104 fulfilled in the past and that are the same as or similar to the part design file 110. However, the multi-staged search 204 can, as described herein, be facilitated in a de-identified manner, such that the privacy of those previous part design files is not sacrificed. Indeed, as described herein, those previous part design files can actually be absent or otherwise unavailable (e.g., can be not stored in the historical database 202), and the search component 122 can nevertheless perform the multi-staged search 204.

In various aspects, the result component 124 can perform, initiate, or otherwise commence any suitable electronic actions, based upon the multi-staged search 204. In various instances, such electronic actions can be referred to as the one or more electronic actions 212. In various cases, the one or more electronic actions 212 can depend upon how the client request 106 is interpreted.

As a non-limiting example, suppose that the client request 106 is interpreted as a request that the part design file 110 be fulfilled by the one or more manufacturing facilities 104. In such case, completion of the multi-staged search 204 can be considered as determining, in de-identified fashion, whether or not the part design file 110 is the same as or similar to a previous part design file that is known to be subject to a manufacturing restriction, such that fulfillment of the part design file 110 would infringe or violate that manufacturing restriction. If the multi-staged search 204 leads to a determination that fulfillment of the part design file 110 would violate or infringe a known manufacturing restriction, the one or more electronic actions 212 can include electronically instructing the one or more manufacturing facilities 104 to refrain from fulfilling the part design file 110, and can also include notifying the client's computing device that such fulfillment is not permitted. On the other hand, if the multi-staged search 204 instead leads to a determination that such fulfillment would not violate or infringe any known manufacturing restriction, the one or more electronic actions 212 can include electronically instructing the one or more manufacturing facilities 104 to begin or prepare for fulfillment of the part design file 110, and can also include notifying the client's computing device that such fulfillment will be carried out.

As another non-limiting example, suppose that the client request 106 is interpreted as a prospective inquiry asking what costs or manufacturing processes might be expected if the part design file 110 were to be fulfilled by the one or more manufacturing facilities 104. In such case, completion of the multi-staged search 204 can be considered as determining, in de-identified fashion, which (if any) previous part design files that were fulfilled by the one or more manufacturing facilities 104 are the same as or similar to the part design file 110. If the multi-staged search 204 uncovers one or more previous part design files that are the same as or similar to the part design file 110, then the one or more electronic actions 212 can include electronically sharing with the client's computing device whatever costs or manufacturing processes were involved in fulfilling those one or more previous part design files. On the other hand, if the multi-staged search 204 instead uncovers no previous part design files that are the same as or similar to the part design file 110, then the one or more electronic actions 212 can include electronically notifying the client's computing device that nothing similar to the part design file 110 has previously been fulfilled by the one or more manufacturing facilities 104, and that the costs or manufacturing processes that would be involved in such fulfillment will accordingly have to be determined from scratch.

As yet another non-limiting example, suppose that the part design file 110 is already known to be subject to a manufacturing restriction, and suppose that the client request 106 is interpreted as a retrospective inquiry asking whether the one or more manufacturing facilities 104 violated or infringed that manufacturing restriction by previously fulfilling a same or similar part design file. In such case, completion of the multi-staged search 204 can be considered as determining, in de-identified fashion, which (if any) previous part design files that were fulfilled by the one or more manufacturing facilities 104 are the same as or similar to the part design file 110. If the multi-staged search 204 uncovers one or more previous part design files that are the same as or similar to the part design file 110, then the one or more electronic actions 212 can include electronically notifying the client's computing device that the one or more manufacturing facilities 104 might have violated or infringed the manufacturing restriction in the past. On the other hand, if the multi-staged search 204 instead uncovers no previous part design files that are the same as or similar to the part design file 110, then the one or more electronic actions 212 can include electronically notifying the client's computing device that the one or more manufacturing facilities 104 have not violated or infringed the manufacturing restriction in the past.

Figure 3:
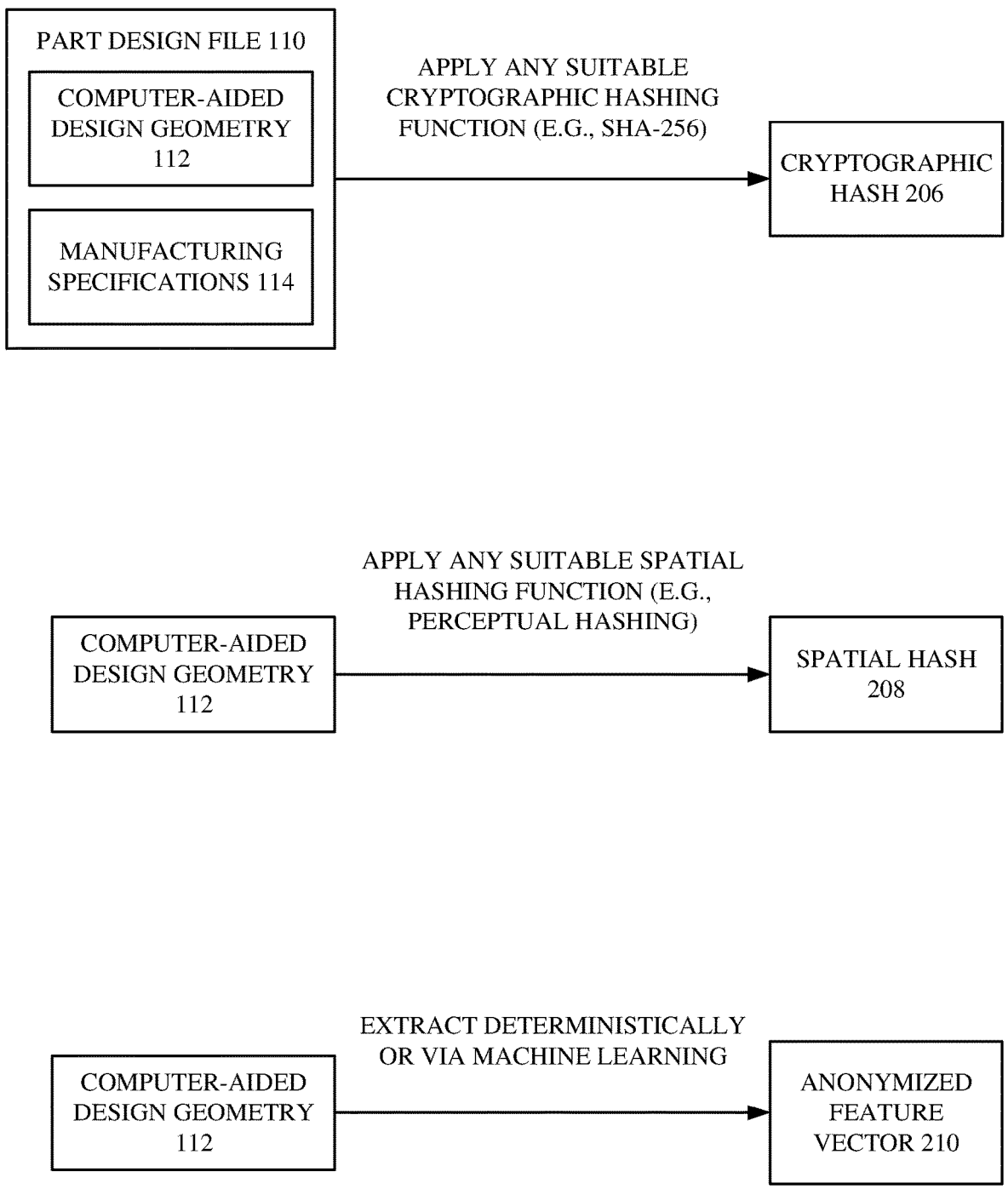
FIG. 3 illustrates an example, non-limiting block diagram showing how a cryptographic hash, a spatial hash, and an anonymized feature vector can be generated in accordance with one or more embodiments described herein.

FIG. 3 illustrates an example, non-limiting block diagram 300 showing how the cryptographic hash 206, the spatial hash 208, and the anonymized feature vector 210 can be generated in accordance with one or more embodiments described herein.

In various embodiments, as mentioned above, the search component 122 can electronically generate the cryptographic hash 206 based on the client request 106. More specifically, in various aspects, the search component 122 can electronically generate the cryptographic hash 206, by applying any suitable cryptographic hashing function to the part design file 110. As mentioned above, the cryptographic hashing function can be any suitable mathematical function or algorithm that can receive as an argument a one-dimensional input of arbitrary length (e.g., a text string having an arbitrary total number of characters) and that can produce a one-dimensional output of fixed length (e.g., a text string having a fixed total number of characters) that is unique to the one-dimensional input. In various cases, the one-dimensional output of fixed length can be referred to as a cryptographic hash that corresponds to the one-dimensional input of arbitrary length. As also mentioned above, the cryptographic hashing function can be one-way, such that a third-party that has access only to a cryptographic hash cannot reliably or accurately infer what specific one-dimensional, arbitrary-length input corresponds to that cryptographic hash. As a non-limiting example, the cryptographic hashing function can be SHA-256.

Accordingly, in various aspects, the search component 122 can electronically execute the cryptographic hashing function on the part design file 110, and such execution can yield the cryptographic hash 206. In particular, the search component 122 can convert the part design file 110 from whatever file format it currently or initially has to a one-dimensional file format. For instance, the one or more manufacturing specifications 114 can be currently or initially formatted as a text file (e.g., .TXT), which can be considered as a one-dimensional file format (e.g., a text file can be considered as a long text string, which can be one-dimensional). Moreover, the CAD geometry 112 can be currently or initially formatted as a multi-dimensional, non-text file (e.g., .DWG or .DAT). Accordingly, the search component 122 can convert or transform the CAD geometry 112 into a one-dimensional file format (e.g., via a .DWG to .TXT converter, or via a .DAT to .TXT converter). After the part design file 110 is converted to a one-dimensional file format, the search component 122 can feed that version of the part design file 110 to the cryptographic hashing function, which can yield the cryptographic hash 206. Thus, the cryptographic hash 206 can be considered as a one-dimensional, fixed-length string that uniquely or distinctly corresponds to or represents the part design file 110. In other words, the cryptographic hash 206 can be considered as a unique fingerprint or unique signature of the part design file 110.

In various embodiments, as mentioned above, the search component 122 can electronically generate the spatial hash 208 based on the client request 106. More specifically, in various aspects, the search component 122 can electronically generate the spatial hash 208, by applying any suitable spatial hashing function to the CAD geometry 112. As mentioned above, the spatial hashing function can be any suitable mathematical function or algorithm that can receive as an argument a multi-dimensional input of arbitrary lengths (e.g., three-dimensional volumes or two-dimensional projections thereof) and that can produce a one-dimensional output of fixed length (e.g., a text string having a fixed total number of characters) that is unique to the multi-dimensional input. In various cases, the one-dimensional output of fixed length can be referred to as a spatial hash that corresponds to the multi-dimensional input of arbitrary lengths. As also mentioned above, the spatial hashing function can be one-way, such that a third-party that has access only to a spatial hash cannot reliably or accurately infer what specific multi-dimensional, arbitrary-length input corresponds to that spatial hash. As a non-limiting example, the spatial hashing function can be perceptual hashing. As another non-limiting example, the spatial hashing function can be nearly minimal perfect hashing.

Accordingly, in various aspects, the search component 122 can electronically execute the spatial hashing function on the CAD geometry 112, and such execution can yield the spatial hash 208. Note that, in some instances, the CAD geometry 112 can currently or initially be in a multi-dimensional file format (e.g., .DWG or .DAT). In such case, the search component 122 can feed the CAD geometry 112 to the spatial hashing function directly, thereby yielding the spatial hash 208. In other instances, however, the CAD geometry 112 can instead currently or initially be in a one-dimensional file format (e.g., .TXT). In such case, the search component 122 can convert or transform the CAD geometry 112 into a multi-dimensional file format (e.g., via a .TXT to .DWG converter, or via a .TXT to .DAT converter), and the search component 122 can feed that version of the CAD geometry 112 to the spatial hashing function, thereby yielding the spatial hash 208. In any case, the spatial hash 208 can be considered as a one-dimensional, fixed-length string that uniquely or distinctly corresponds to or represents the CAD geometry 112. In other words, the spatial hash 208 can be considered as a unique fingerprint or unique signature of the CAD geometry 112.

In various embodiments, as mentioned above, the search component 122 can electronically generate the anonymized feature vector 210 based on the client request 106. More specifically, in various aspects, the search component 122 can electronically extract or generate the anonymized feature vector 210 from the CAD geometry 112. In various instances, the anonymized feature vector 210 can be considered as any suitable vector (e.g., a collection of any suitable number of real-valued scalars) that has a smaller size than the CAD geometry 112 (e.g., the total number of elements of that vector can be lesser than the total number of elements of the CAD geometry 112). Moreover, despite such smaller size, the anonymized feature vector 210 can represent or otherwise convey (albeit in a hidden, obfuscated, or non-apparent fashion) substantive characteristics, attributes, or properties of the CAD geometry 112. Thus, the anonymized feature vector 210 can, in some cases, be considered as an embedded representation or latent vector representation of the CAD geometry 112.

In some aspects, the search component 122 can electronically generate the anonymized feature vector 210 in a deterministic, non-machine-learning fashion. Indeed, the search component 122 can, in various instances, electronically read the CAD geometry 112. During or via such reading, the search component 122 can electronically extract or identify any suitable spatial or geometric characteristics, attributes, or properties that are conveyed by the CAD geometry 112. As some non-limiting examples, the search component 122 can extract or identify: one or more shapes (e.g., circular, spherical, rectilinear, pyramidal, concave, convex) that are exhibited by one or more portions of the CAD geometry 112; one or more orientations (e.g., as measured with respect to any suitable reference frames or reference axes) that are exhibited by one or more portions of the CAD geometry 112; one or more lengths that are exhibited by one or more portions of the CAD geometry 112; one or more widths that are exhibited by one or more portions of the CAD geometry 112; one or more heights that are exhibited by one or more portions of the CAD geometry 112; one or more diameters that are exhibited by one or more portions of the CAD geometry 112; one or more thicknesses that are exhibited by one or more portions of the CAD geometry 112; one or more radii of curvature that are exhibited by one or more portions of the CAD geometry 112; or one or more taper rates that are exhibited by one or more portions of the CAD geometry 112. In various cases, the search component 122 can electronically concatenate such extracted or identified characteristics, attributes, or properties together. In various instances, such concatenation can be considered or otherwise referred to as a feature vector. In various cases, the search component 122 can electronically feed such concatenation or feature vector to any suitable scrambling function, and whatever scrambled vector is outputted by the scrambling function can be considered or referred to as the anonymized feature vector 210. Note that, because the scrambling function can be implemented, it can be unclear to a third-party which specific numerical elements of the anonymized feature vector 210 indicate or represent which specific characteristics, attributes, or properties of the CAD geometry 112. In other words, the third-party could not reliably or accurately infer the CAD geometry 112 by considering the anonymized feature vector 210 by itself, hence the term "anonymized".

In other aspects, the search component 122 can instead electronically generate the anonymized feature vector 210 in a stochastic, machine learning fashion. Indeed, the search component 122 can, in various instances, electronically store, electronically maintain, electronically control, or otherwise electronically access a deep learning neural network. In various cases, the deep learning neural network can have or otherwise exhibit any suitable internal architecture. For instance, the deep learning neural network can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of its internal architecture, the deep learning neural network can be configured to receive as input CAD geometries and to produce as output anonymized feature vectors based on those CAD geometries. In particular, the deep learning neural network can be trained in unsupervised fashion (e.g., using any suitable training batch sizes, any suitable loss or objective functions, or any suitable training termination criteria) as an encoder in an encoder-decoder deep learning pipeline. During such training, the deep learning neural network can learn how to compress or encode inputted CAD geometries into embedded representations or latent vector representations. Thus, in various aspects, the search component 122 can electronically execute the deep learning neural network on the CAD geometry 112, and whatever embedded representation or latent vector representation that the deep learning neural network produces for the CAD geometry 112 can be referred to as the anonymized feature vector 210. Similar as above, note that, because the deep learning neural network can be implemented, it can be unclear to a third-party what specific characteristics, attributes, or properties of the CAD geometry 112 are respectively represented by the numerical elements of the anonymized feature vector 210. In other words, the third-party could not reliably or accurately infer the CAD geometry 112 by considering the anonymized feature vector 210 by itself, again hence the term "anonymized".

Note that the anonymized feature vector 210 can comprise any suitable number of numerical elements, with each numerical element representing (e.g., in obfuscated or anonymized fashion) a respective spatial or geometric property, characteristic, or attribute of the computer-aided design geometry 112. Thus, in some embodiments, the anonymized feature vector 210 can comprise multiple numerical elements, so as to represent multiple respective spatial properties of the computer-aided design geometry 112. However, in other embodiments, the anonymized feature vector 210 can instead comprise a single numerical element, so as to represent a single respective spatial property of the computer-aided design geometry 112.

Figure 4:
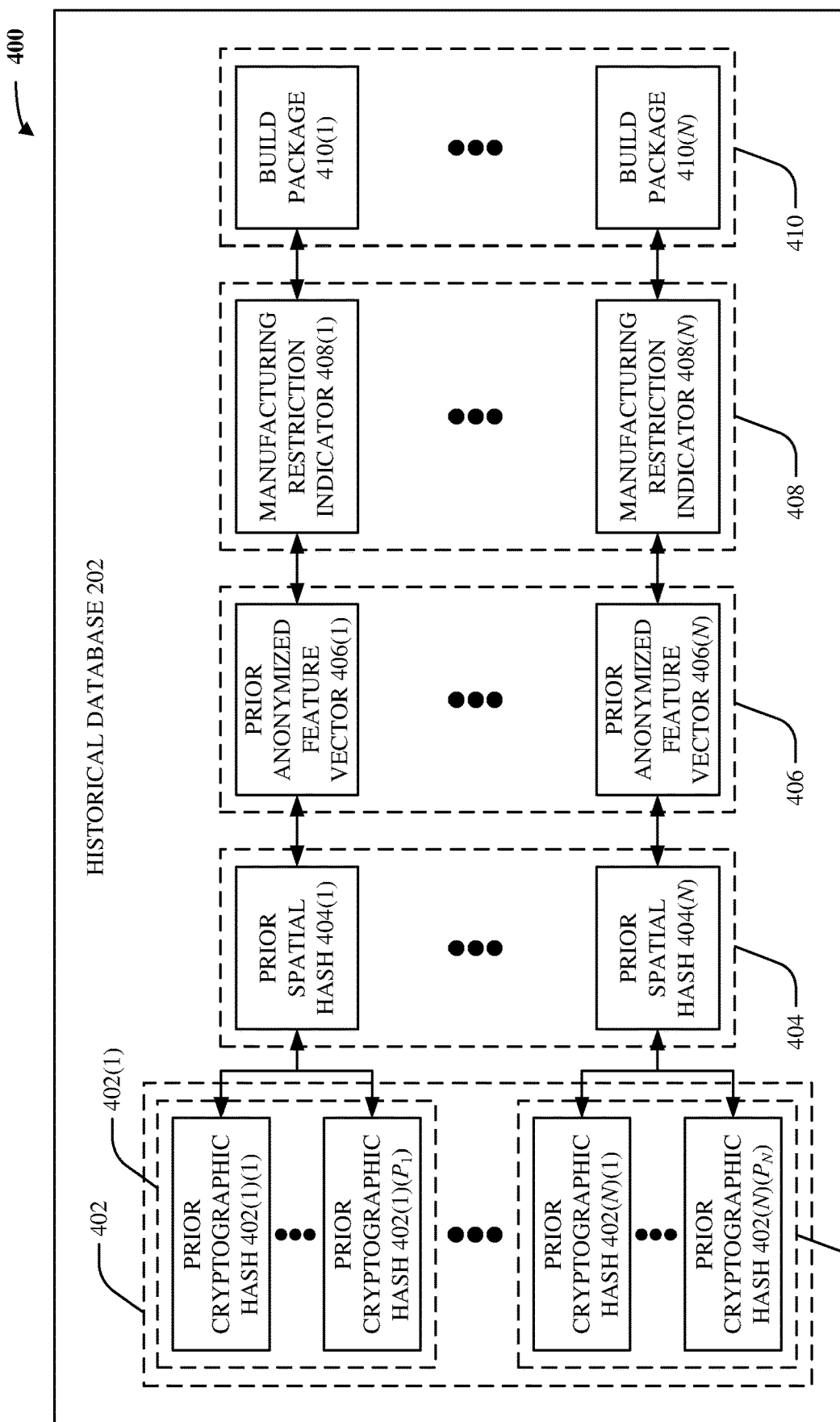
FIG. 4 illustrates an example, non-limiting block diagram of an historical database in accordance with one or more embodiments described herein.

FIG. 4 illustrates an example, non-limiting block diagram 400 of the historical database 202 in accordance with one or more embodiments described herein.

In various embodiments, as shown, the historical database 202 can comprise a set of groups of prior cryptographic hashes 402, a set of prior spatial hashes 404, a set of prior anonymized feature vectors 406, a set of manufacturing restriction indicators 408, or a set of build packages 410.

In various aspects, suppose that the one or more manufacturing facilities 104 fulfilled a total of $\Sigma_{i=1}^{n} p_i$ previous part design files that were distinct or somehow non-identical to each other (e.g., previous part design files that were fulfilled multiple times can be not double-counted), for any suitable positive integers $p_i$ for $i \in \{1, 2, \ldots, n\}$. In other words, such previous part design files can be considered as being divvied up into n non-overlapping subsets: a first subset having a total of $p_1$ previous part design files, to an n-th subset having a total of $p_n$ previous part design files. Note that $n \leq \Sigma_{i=1}^{n} p_i$. Now, suppose that each of such n subsets corresponds to a unique or distinct CAD geometry. That is, the $p_1$ previous part design files in the first subset can be considered as all having or sharing a first CAD geometry, and the $p_n$ previous part design files in the n-th subset can be considered as all having or sharing an n-th CAD geometry. Note that is possible for two or more different or non-identical previous part design files to have the same CAD geometry as each other, since such two or more different or non-identical previous part design files can have different or non-identical manufacturing specifications.

Now, in various aspects, the search component 122 can have electronically generated (via the cryptographic hashing function) a respective cryptographic hash for each of the $\Sigma_{i=1}^{n} p_i$ previous part design files that were fulfilled by the one or more manufacturing facilities 104. This can have yielded the set of groups of prior cryptographic hashes 402. As shown, the set of groups of prior cryptographic hashes 402 can comprise n groups, for any suitable positive integer n: a group of prior cryptographic hashes 402(1) to a group of prior cryptographic hashes 402(n). In various instances, the group of prior cryptographic hashes 402(1) can comprise $p_1$ hashes: a prior cryptographic hash 402(1)(1) to a prior cryptographic hash 402(1)($p_1$). In other words, the search component 122 can have generated the prior cryptographic hash 402(1)(1) by executing the cryptographic hashing function on a first previous part design file in the first subset of previous part design files, and the search component 122 can have generated the prior cryptographic hash 402(1)($p_1$) by executing the cryptographic hashing function on a $p_1$-th previous part design file in the first subset of previous part design files. Likewise, in various cases, the group of prior cryptographic hashes 402(n) can comprise $p_n$ hashes: a prior cryptographic hash 402(n)(1) to a prior cryptographic hash 402(n)($p_n$). That is, the search component 122 can have generated the prior cryptographic hash 402(n)(1) by executing the cryptographic hashing function on a first previous part design file in the n-th subset of previous part design files, and the search component 122 can have generated the prior cryptographic hash 402(n)($p_n$) by executing the cryptographic hashing function on a $p_n$-th previous part design file in the n-th subset of previous part design files.

In various aspects, the search component 122 can have electronically generated (via the spatial hashing function) a respective spatial hash for each of the $\Sigma_{i=1}^{n} p_i$ previous part design files that were fulfilled by the one or more manufacturing facilities 104. However, as mentioned above, it can be the case that the $\Sigma_{i=1}^{n} p_i$ previous part design files had among them only n distinct CAD geometries. Accordingly, the search component 122 can have generated (via the spatial hashing function) a respective prior spatial hash for each of such n distinct CAD geometries, which can have yielded the set of prior spatial hashes 404. Thus, the set of prior spatial hashes 404 can comprise n hashes: a prior spatial hash 404(1) to a prior spatial hash 404(n).

In various instances, each of the set of groups of prior cryptographic hashes 402 can correspond to a respective one of the set of prior spatial hashes 404. As a non-limiting example, and as mentioned above, the $p_1$ previous part design files in the first subset of previous part design files can be considered as all having or sharing a first CAD geometry, and the search component 122 can have generated the prior spatial hash 404(1) by executing the spatial hashing function on that first CAD geometry. Thus, the prior spatial hash 404(1) can be considered as corresponding to the group of prior cryptographic hashes 402(1). As another non-limiting example, and as mentioned above, the $p_n$ previous part design files in the n-th subset of previous part design files can be considered as all having or sharing an n-th CAD geometry, and the search component 122 can have generated the prior spatial hash 404(n) by executing the spatial hashing function on that n-th CAD geometry. So, the prior spatial hash 404(n) can be considered as corresponding to the group of prior cryptographic hashes 402(n).

In various aspects, the search component 122 can have electronically generated (via deterministic extraction or machine learning) a respective anonymized feature vector for each of the $\Sigma_{i=1}^{n} p_i$ previous part design files that were fulfilled by the one or more manufacturing facilities 104. However, as mentioned above, it can be the case that the $\Sigma_{i=1}^{n} p_i$ previous part design files had among them only n distinct CAD geometries. Accordingly, the search component 122 can have generated (via deterministic extraction or machine learning) a respective prior anonymized feature vector for each of such n distinct CAD geometries, which can have yielded the set of prior anonymized feature vectors 406. Thus, the set of prior anonymized feature vectors 406 can comprise n feature vectors: a prior anonymized feature vector 406(1) to a prior anonymized feature vector 406(n).

In various instances, each of the set of groups of prior cryptographic hashes 402 and each of the set of prior spatial hashes 404 can correspond to a respective one of the set of prior anonymized feature vectors 406. As a non-limiting example, and as mentioned above, the $p_1$ previous part design files in the first subset of previous part design files can be considered as all having or sharing a first CAD geometry, and the search component 122 can have generated the prior anonymized feature vector 406(1) by applying deterministic extraction or machine learning to that first CAD geometry. Thus, the prior anonymized feature vector 406(1) can be considered as corresponding to the group of prior cryptographic hashes 402(1) and to the prior spatial hash 404(1). As another non-limiting example, and as mentioned above, the $p_n$ previous part design files in the n-th subset of previous part design files can be considered as all having or sharing an n-th CAD geometry, and the search component 122 can have generated the prior anonymized feature vector 406(n) by applying deterministic extraction or machine learning to that n-th CAD geometry. So, the prior anonymized feature vector 406(n) can be considered as corresponding to the group of prior cryptographic hashes 402(n) and to the prior spatial hash 404(n).

In various aspects, the set of manufacturing restriction indicators 408 can comprise n indicators: a manufacturing restriction indicator 408(1) to a manufacturing restriction indicator 408(n). In various instances, each of the set of manufacturing restriction indicators 408 can be any suitable electronic data that indicates, conveys, represents, or otherwise specifies whether a respective one of the set of groups of prior cryptographic hashes 402, a respective one of the set of prior spatial hashes 404, or a respective one of the set of prior anonymized feature vectors 406 is known to be subject to a manufacturing restriction. As a non-limiting example, the manufacturing restriction indicator 408(1) can correspond to the first CAD geometry mentioned above, and thus can be considered as corresponding to the group of prior cryptographic hashes 402(1), to the prior spatial hash 404

(1), and to the prior anonymized feature vector 406(1). Accordingly, the manufacturing restriction indicator 408(1) can specify what, if any, manufacturing restrictions are known to apply to that first CAD geometry. In some cases, the manufacturing restriction indicator 408(1) can specify that such first CAD geometry is subject to an intellectual property restriction (e.g., patent protection, trade secret protection) or to a governmental security restriction (e.g., international regulation of weapons) that permits such first CAD geometry to be fabricated only on behalf of one or more listed clients. In other cases, the manufacturing restriction indicator 408(1) can specify that such first CAD geometry is not subject to any manufacturing restrictions. As another non-limiting example, the manufacturing restriction indicator 408(n) can correspond to the n-th CAD geometry mentioned above, and thus can be considered as corresponding to the group of prior cryptographic hashes 402(n), to the prior spatial hash 404(n), and to the prior anonymized feature vector 406(n). Accordingly, the manufacturing restriction indicator 408(n) can specify what, if any, manufacturing restrictions are known to apply to that n-th CAD geometry. Just as above, the manufacturing restriction indicator 408(n) can, in some cases, specify that such n-th CAD geometry is subject to an intellectual property restriction or to a governmental security restriction that permits such n-th CAD geometry to be fabricated only on behalf of one or more listed clients. In other cases, the manufacturing restriction indicator 408(n) can instead specify that such n-th CAD geometry is not subject to any manufacturing restrictions.

In various aspects, the set of build packages 410 can comprise n build packages: a build package 410(1) to a build package 410(n). In various instances, each of the set of build packages 410 can be any suitable electronic record that indicates, conveys, represents, or otherwise specifies any suitable manufacturing information associated with a respective one of the set of groups of prior cryptographic hashes 402, a respective one of the set of prior spatial hashes 404, or a respective one of the set of prior anonymized feature vectors 406. As a non-limiting example, the build package 410(1) can correspond to the first CAD geometry mentioned above, and thus can be considered as corresponding to the group of prior cryptographic hashes 402(1), to the prior spatial hash 404(1), and to the prior anonymized feature vector 406(1). Accordingly, the build package 410(1) can specify any suitable information pertaining to how, when, or where a part was previously fabricated by the one or more manufacturing facilities 104 in accordance with that first CAD geometry. Non-limiting examples of such information can include: one or more manufacturing processes that were previously implemented to fabricate that first CAD geometry; one or more engineering analyses that were previously implemented to test that first CAD geometry; one or more materials that were previously used to fabricate that first CAD geometry; one or more tolerances that were previously implemented to fabricate that first CAD geometry; one or more costs that were previously incurred to fabricate that first CAD geometry; or one or more scrap rates that were previously incurred to fabricated that first CAD geometry. As another non-limiting example, the build package 410(n) can correspond to the n-th CAD geometry mentioned above, and thus can be considered as corresponding to the group of prior cryptographic hashes 402(n), to the prior spatial hash 404(n), and to the prior anonymized feature vector 406(n). Accordingly, the build package 410(n) can specify any suitable information pertaining to how, when, or where a part was previously fabricated by the one or more manufacturing facilities 104 in accordance with that n-th CAD geometry (e.g., one or more manufacturing processes that were previously implemented to fabricate that n-th CAD geometry; one or more engineering analyses that were previously implemented to test that n-th CAD geometry; one or more materials that were previously used to fabricate that n-th CAD geometry; one or more tolerances that were previously implemented to fabricate that n-th CAD geometry; one or more costs that were previously incurred to fabricate that n-th CAD geometry; or one or more scrap rates that were previously incurred to fabricated that n-th CAD geometry).

In any case, note that the historical database 202 can refrain from storing any of the $\Sigma_{i=1}^{n} p_i$ previous part design files that were fulfilled by the one or more manufacturing facilities 104 in the past. Instead, the historical database 202 can store de-identified information (e.g., 402, 404, 406, 408, and 410) that is associated with those previous part design files but from which those previous part design files cannot be reliably inferred by third-parties. In other words, if a third-party were to have access to the historical database 202, that third-party would be able to read only such de-identified data associated with those previous part design files; that third-part would have no access to, nor would they be able to reliably infer, the specific CAD geometries (often considered of utmost sensitivity or privacy) of those previous part design files.

Now, in various aspects, the search component 122 can electronically perform the multi-staged search 204 through or in the historical database 202, by leveraging the cryptographic hash 206, the spatial hash 208, or the anonymized feature vector 210. Non-limiting aspects of the multi-staged search 204 are described with respect to FIGS. 5-14. In particular, FIGS. 5-8 pertain to various embodiments in which it can be desired to determine whether fulfillment of the part design file 110 by the one or more manufacturing facilities 104 would violate or infringe a known manufacturing restriction, FIGS. 9-11 pertain to various embodiments in which it can be desired to determine what costs or manufacturing processes might be involved if the part design file 110 were to be fulfilled by the one or more manufacturing facilities 104, and FIGS. 12-14 pertain to various embodiments in which the part design file 110 is already known to be subject to a manufacturing restriction and where it can be desired to determine whether the one or more manufacturing facilities 104 previously violated that manufacturing restriction.

Figure 5:
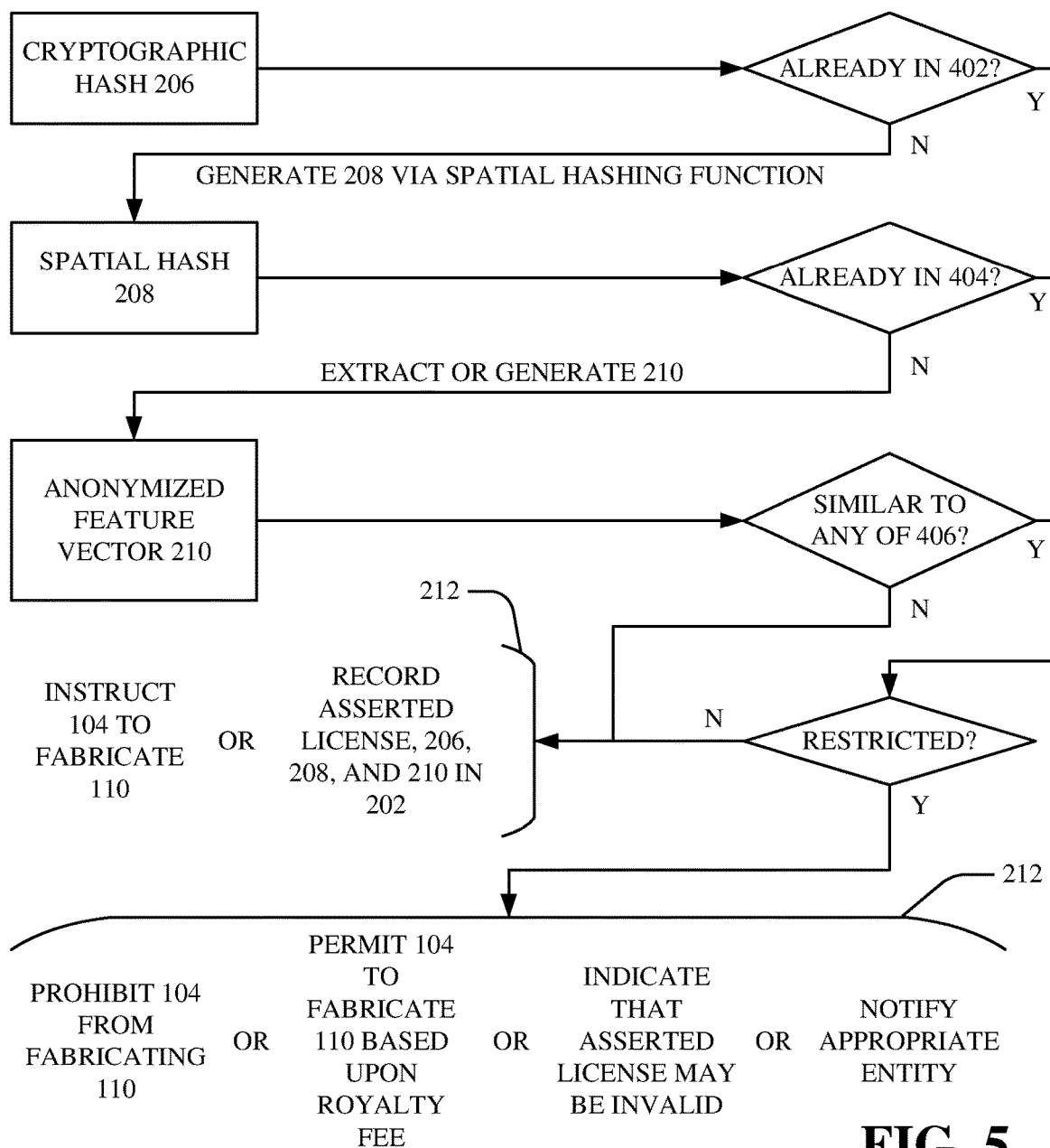
FIG. 5 illustrates an example, non-limiting block diagram showing how a multi-staged search of an historical database can be implemented to determine whether or not a given part design is subject to a manufacturing restriction in accordance with one or more embodiments described herein.

First, consider FIGS. 5-8. FIG. 5 illustrates an example, non-limiting block diagram 500 showing how the multi-staged search 204 of the historical database 202 can be implemented to determine whether or not the part design file 110 is subject to a manufacturing restriction in accordance with one or more embodiments described herein.

In various embodiments, as shown, FIG. 5 can pertain to a scenario 502. In the scenario 502, the client request 106 can be considered or interpreted as a manufacturing request for whatever part is characterized by the part design file 110. In other words, the client request 106 can be considered or interpreted as the placement of a manufacturing or fabrication order with the one or more manufacturing facilities 104, where such manufacturing or fabrication order asks that the part design file 110 be fulfilled. In some cases, the client request 106 can be accompanied by an asserted license. That is, the client associated with the client request 106 can be requesting that the part design file 110 be fulfilled and can be claiming ownership of (e.g., intellectual property rights to) the part design file 110. In other cases, however, the client request 106 can be unaccompanied by the asserted license. That is, the client associated with the client request 106 can be requesting that the part design file 110 be fulfilled but can refrain from claiming ownership of the part design file 110.

In various aspects, the search component 122 can facilitate the multi-staged search 204 as follows.

First, the search component 122 can generate the cryptographic hash 206, as described above. The search component 122 can, in various instances, then search through the historical database 202 to determine whether or not the cryptographic hash 206 is already present in the set of groups of prior cryptographic hashes 402. Suppose that the cryptographic hash 206 is already present in the set of groups of prior cryptographic hashes 402. In other words, suppose that the one or more manufacturing facilities 104 previously fulfilled the part design file 110 (e.g., one of the previous part design files fulfilled by the one or more manufacturing facilities 104 was equivalent or identical to the part design file 110). In such case, the search component 122 can determine whether or not the part design file 110 is subject to a manufacturing restriction, by identifying whichever of the set of manufacturing restriction indicators 408 corresponds to the cryptographic hash 206 and by applying that identified manufacturing restriction indicator to the client identifier 108.

In some instances, the identified manufacturing restriction indicator can specify that the cryptographic hash 206 (and thus the part design file 110) is not restricted. For example, the identified manufacturing restriction indicator can specify that the cryptographic hash 206 is subject to no manufacturing restriction at all. As another example, the identified manufacturing restriction indicator can specify that the cryptographic hash 206 is subject to a manufacturing restriction, but the identified manufacturing restriction indicator can list the client identifier 108 as a permitted entity or can fail to list the client identifier 108 as a prohibited or blacklisted entity. In such cases, the one or more electronic actions 212 can comprise instructing or commanding the one or more manufacturing facilities 104 to fulfill (e.g., to manufacture, to fabricate) the part design file 110. Also in such cases, if the client request 106 is accompanied by an asserted license, the one or more electronic actions 212 can comprise recording that asserted license in the historical database 202 (e.g., updating the identified manufacturing restriction indicator to reflect the asserted license). For ease of explanation, any of these embodiments of the one or more electronic actions 212 can be referred to as unrestricted actions (e.g., as actions that can be taken if the part design file 110 is determined to be unrestricted).

In other instances, the identified manufacturing restriction indicator can instead specify that the cryptographic hash 206 (and thus the part design file 110) is subject to a manufacturing restriction, and the identified manufacturing restriction indicator can list the client identifier 108 as a prohibited/blacklisted entity or can fail to list the client identifier 108 as a permitted entity. In some such cases, the one or more electronic actions 212 can comprise instructing or commanding the one or more manufacturing facilities 104 to refrain from fulfilling (e.g., to not manufacture, to not fabricate) the part design file 110. In others of such cases, if the manufacturing restriction that constrains the cryptographic hash 206 (and thus the part design file 110) is an intellectual property restriction, then the one or more electronic actions 212 can include notifying the client that the fulfillment of the part design file 110 will be permitted upon payment of one or more royalty fees. In still others of such cases, if the client request 106 is accompanied by an asserted license, then the one or more electronic actions 212 can include notifying the client that the asserted license seems to be invalid. In even others of such cases, the one or more electronic actions 212 can include notifying one or more entities that are associated with the manufacturing restriction that constrains the cryptographic hash 206. For example, if that manufacturing restriction is an intellectual property restriction, the result component 124 can send an electronic notification to a computing device (not shown) of whatever entity is the recorded owner or a recorded licensee of such intellectual property restriction, and such electronic notification can state that the intellectual property restriction was tripped, invoked, or otherwise enforced. As another example, if that manufacturing restriction is a governmental security restriction, then the result component 124 can send an electronic notification to a computing device (not shown) of a governmental entity, and such electronic notification can state that the governmental security restriction was tripped, invoked, or otherwise enforced. For case of explanation, any of these embodiments of the one or more electronic actions 212 can be referred to as restricted actions (e.g., as actions that can be taken if the part design file 110 is determined to be restricted).

Now, suppose instead that the cryptographic hash 206 is not already present in the set of groups of prior cryptographic hashes 402. In other words, suppose that the one or more manufacturing facilities 104 had not previously fulfilled the part design file 110 (e.g., none of the previous part design files fulfilled by the one or more manufacturing facilities 104 were equivalent or identical to the part design file 110). In such case, the search component 122 can generate the spatial hash 208, as described above. The search component 122 can, in various instances, then search through the historical database 202 to determine whether or not the spatial hash 208 is already present in the set of prior spatial hashes 404. Suppose that the spatial hash 208 is already present in the set of prior spatial hashes 404. In other words, suppose that the one or more manufacturing facilities 104 previously fulfilled a part design file that comprised the CAD geometry 112 (e.g., one of the previous part design files fulfilled by the one or more manufacturing facilities 104 had a CAD geometry that was equivalent or identical to the CAD geometry 112). In such case, the search component 122 can determine whether or not the part design file 110 is subject to a manufacturing restriction, by identifying whichever of the set of manufacturing restriction indicators 408 corresponds to the spatial hash 208 and by applying that identified manufacturing restriction indicator to the client identifier 108.

In some instances, the identified manufacturing restriction indicator can specify that the spatial hash 208 (and thus the part design file 110) is not restricted. For example, the identified manufacturing restriction indicator can specify that the spatial hash 208 is subject to no manufacturing restriction at all, or can specify that the spatial hash 208 is subject to a manufacturing restriction for which the client identifier 108 is listed as a permitted entity or is not listed as a prohibited/blacklisted entity. In such cases, the one or more electronic actions 212 can comprise any of the above-mentioned unrestricted actions (e.g., proceeding with fabrication/fulfillment of the part design file 110; updating the historical database 202 with an asserted license).

In other instances, the identified manufacturing restriction indicator can instead specify that the spatial hash 208 (and thus the part design file 110) is subject to a manufacturing restriction, and the identified manufacturing restriction indicator can list the client identifier 108 as a prohibited/ blacklisted entity or can fail to list the client identifier 108 as a permitted entity. In such cases, the one or more electronic actions 212 can comprise any of the above-mentioned restricted actions (e.g., prohibiting fabrication/fulfillment of the part design file 110; permitting fabrication/fulfillment of the part design file 110 upon royalty fee payment; notifying the client that the asserted license is invalid; notifying entities associated with the applicable manufacturing restriction).

Now, suppose instead that the spatial hash 208 is not already present in the set of prior spatial hashes 404. In other words, suppose that the one or more manufacturing facilities 104 had not previously fulfilled any part design file having the CAD geometry 112. In such case, the search component 122 can generate the anonymized feature vector 210, as described above. The search component 122 can, in various instances, then search through the historical database 202 to determine whether or not the anonymized feature vector 210 is similar to any of the set of prior anonymized feature vectors 406. In various aspects, the search component 122 can facilitate such similarity determination using any suitable similarity score metrics. As a non-limiting example, the search component 122 compute a cosine similarity value between the anonymized feature vector 210 and each of the set of prior anonymized feature vectors 406 (e.g., in such cases, prior anonymized feature vectors having higher or larger cosine similarity values can be considered as being more similar to the anonymized feature vector 210, whereas prior anonymized feature vectors having lower or smaller cosine similarity values can be considered as being less similar to the anonymized feature vector 210). As another non-limiting example, the search component 122 compute a Euclidean distance value between the anonymized feature vector 210 and each of the set of prior anonymized feature vectors 406 (e.g., in such cases, prior anonymized feature vectors having higher or larger Euclidean distance values can be considered as being less similar to the anonymized feature vector 210, whereas prior anonymized feature vectors having lower or smaller Euclidean distance values can be considered as being more similar to the anonymized feature vector 210). As even other non-limiting examples, any other suitable similarity metrics or vector weighting or comparison techniques can be implemented.

Suppose that none of the set of prior anonymized feature vectors 406 is within any suitable threshold margin of similarity (e.g., any suitable threshold cosine similarity or any suitable threshold Euclidean distance) of the anonymized feature vector 210. In such case, the search component 122 can conclude that the one or more manufacturing facilities 104 have not previously fulfilled or fabricated any part design file having a CAD geometry that is similar to the CAD geometry 112. Accordingly, it can be concluded that no known manufacturing restrictions apply to or constrain the part design file 110. In such case, the one or more electronic actions 212 can comprise any of the above-mentioned unrestricted actions (e.g., proceeding with fabrication/fulfillment of the part design file 110; updating the historical database 202 with an asserted license).

Suppose instead that at least one of the set of prior anonymized feature vectors 406 is within the threshold margin of similarity of the anonymized feature vector 210. In such case, the search component 122 can conclude that the one or more manufacturing facilities 104 have previously fulfilled or fabricated at least one part design file having a CAD geometry that is similar to the CAD geometry 112. Accordingly, the search component 122 can identify whichever of the set of manufacturing restriction indicators 408 correspond to that at least one prior anonymized feature vector. In some instances, those identified manufacturing restriction indicators can specify no manufacturing restrictions at all, can list the client identifier 108 as a permitted entity, or can fail to list the client identifier 108 as a prohibited/blacklisted entity. Thus, the one or more electronic actions 212 can comprise any of the above-mentioned unrestricted actions (e.g., proceeding with fabrication/fulfillment of the part design file 110; updating the historical database 202 with an asserted license). In other instances, those identified manufacturing restriction indicators can instead list the client identifier 108 as a prohibited/blacklisted entity or can fail to list the client identifier 108 as a permitted entity. Accordingly, the one or more electronic actions 212 can comprise any of the above-mentioned restricted actions (e.g., prohibiting fabrication/fulfillment of the part design file 110; permitting fabrication/fulfillment of the part design file 110 upon royalty fee payment; notifying the client that the asserted license is invalid; notifying entities associated with the applicable manufacturing restriction).

Alternatively, rather than determining whether any of the set of prior anonymized feature vectors 406 are within any threshold margin of similarity to the anonymized feature vector 210, the search component 122 can instead identify one or more of the set of prior anonymized feature vectors 406 that are most similar to the anonymized feature vector 210 (e.g., can identify a most similar prior anonymized feature vector, or can identify the top x most similar prior anonymized feature vectors for any suitable positive integer x). The search component 122 can then identify whichever of the set of manufacturing restriction indicators 408 correspond to those one or more prior anonymized feature vectors, and the electronic actions 212 can comprise restricted actions or unrestricted actions in accordance with those manufacturing restriction indicators.

Note that, in any case, the multi-staged search 204 can be considered as comprising a first stage pertaining to the cryptographic hash 206, a second stage pertaining to the spatial hash 208, and a third stage pertaining to the anonymized feature vector 210.

Figure 6:
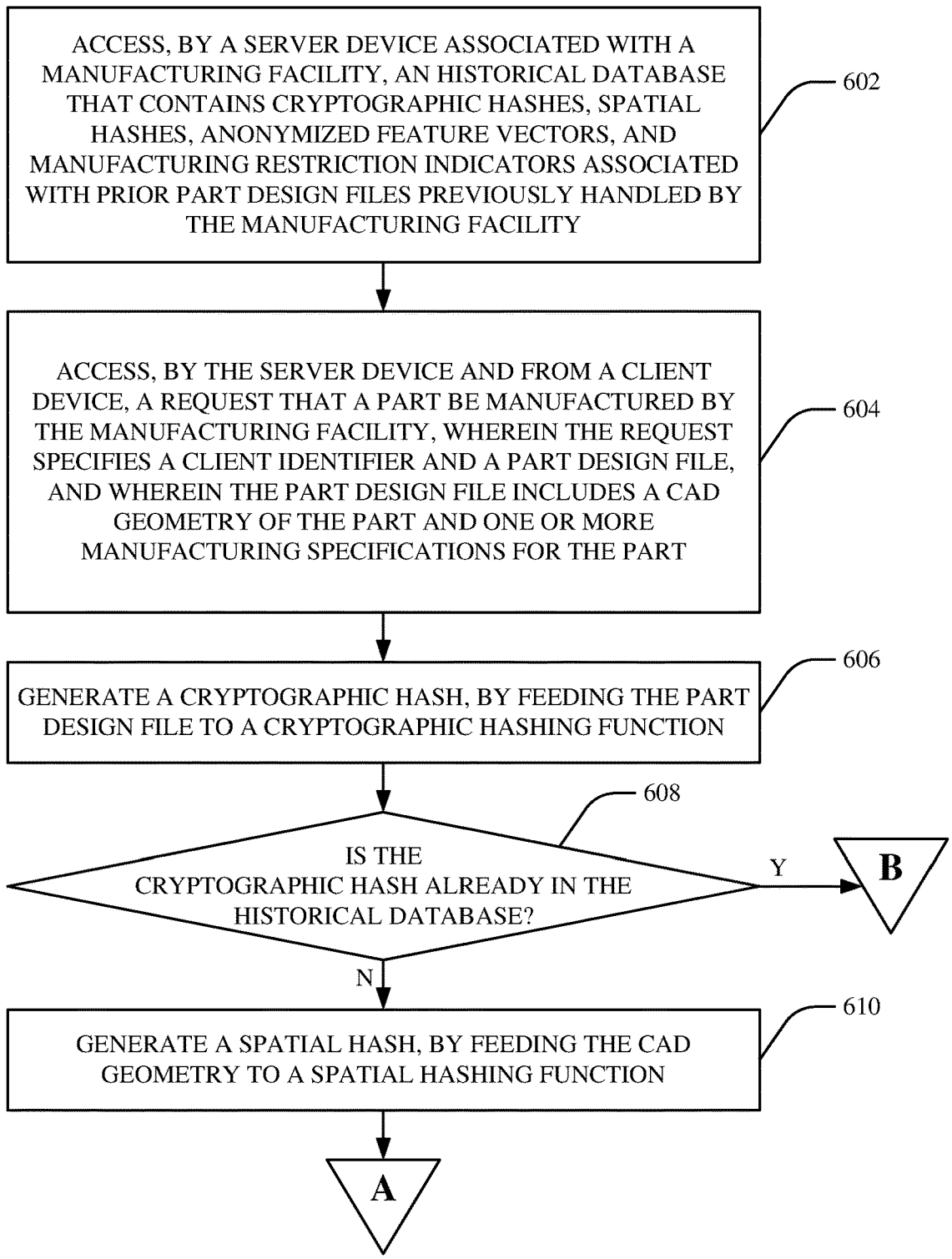
FIGS. 6-8 illustrate flow diagrams of example, non-limiting computer-implemented methods that facilitate a multi-staged search of an historical database so as to determine whether or not a given part design is subject to a manufacturing restriction in accordance with one or more embodiments described herein.
Figure 7:
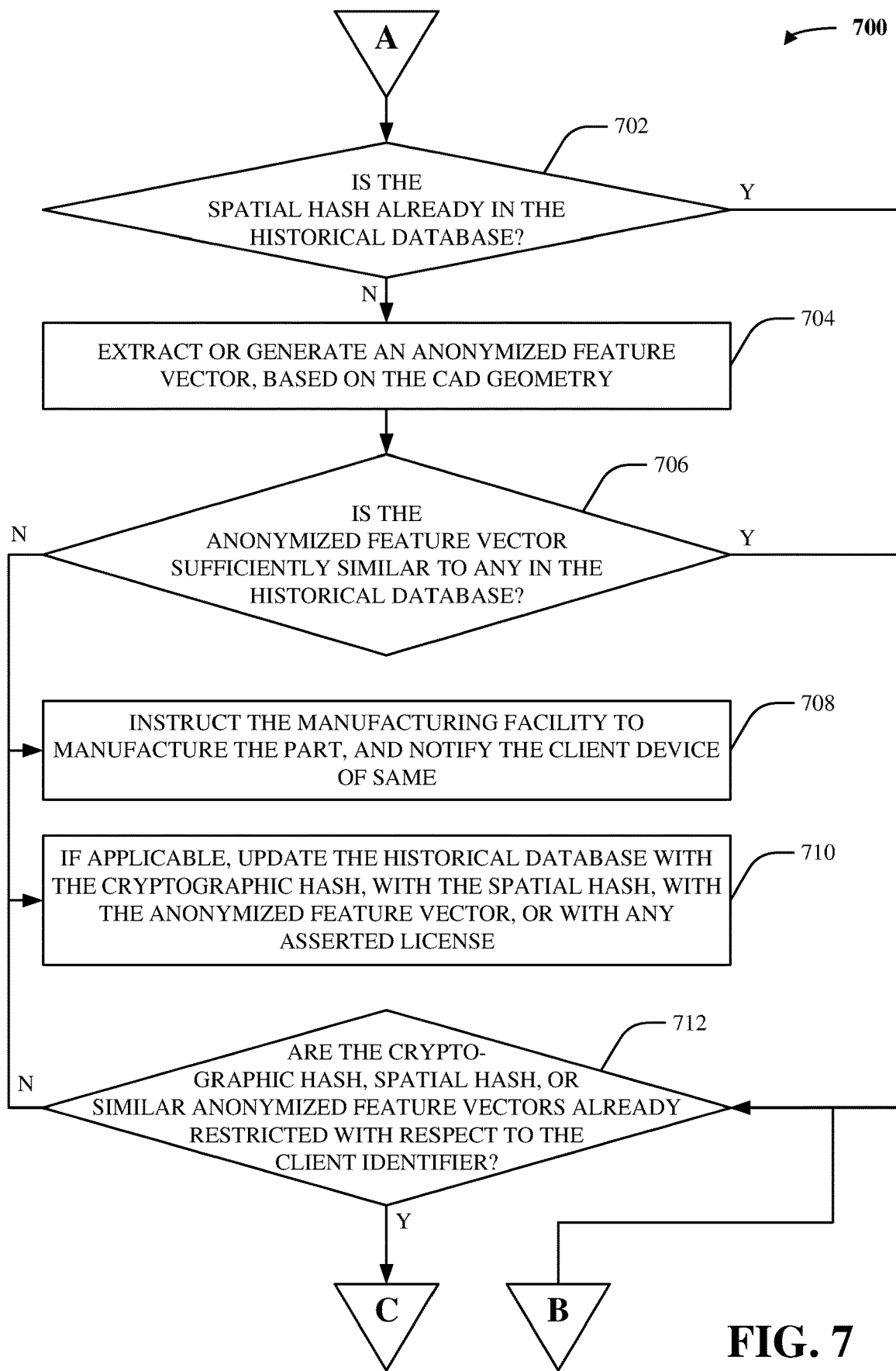
Figure 8:
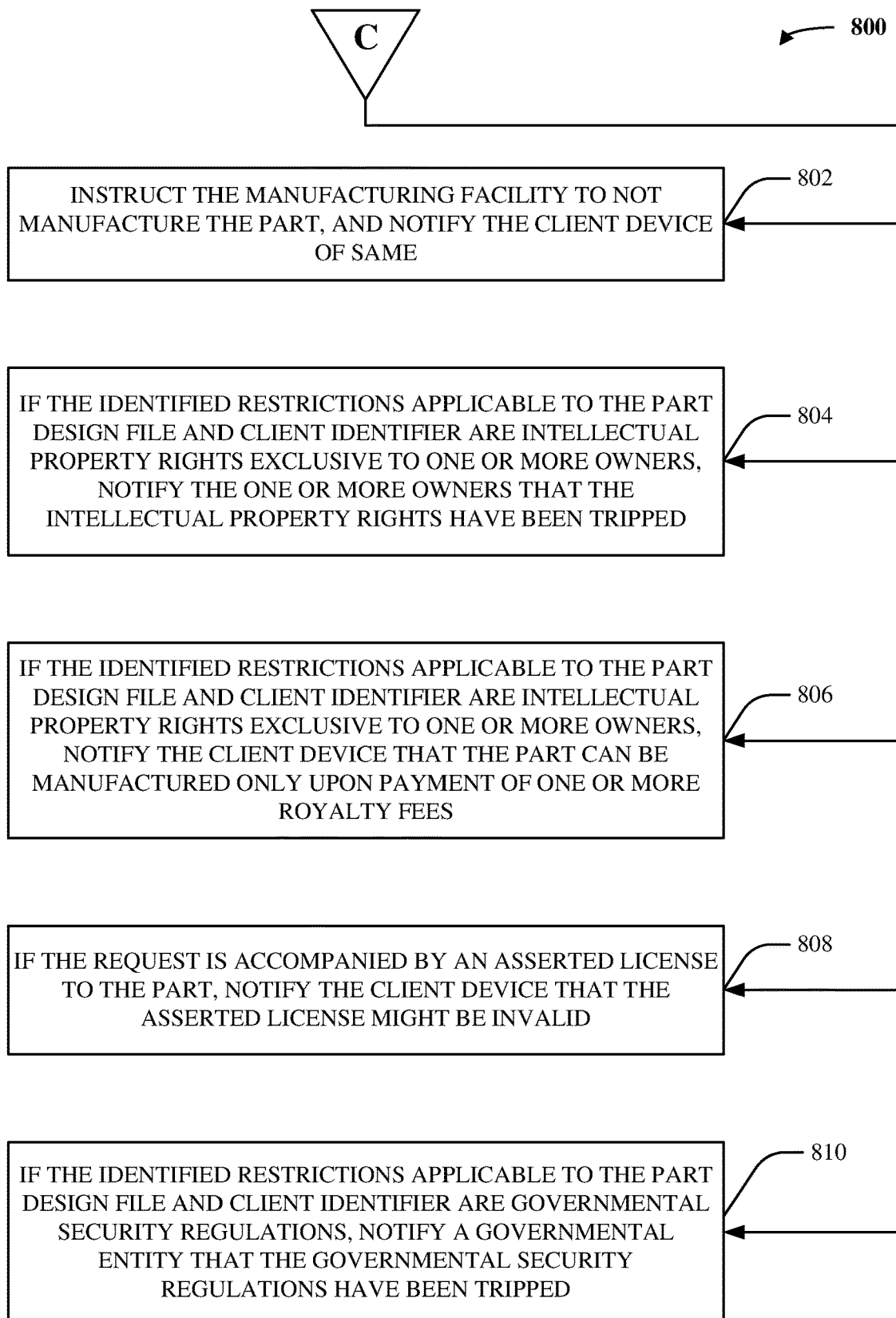

FIGS. 6-8 illustrate flow diagrams of example, non-limiting computer-implemented methods 600, 700, and 800 that can facilitate a multi-staged search (e.g., 204) of an historical database (e.g., 202) so as to determine whether or not a given part design (e.g., 110) is subject to a manufacturing restriction in accordance with one or more embodiments described herein. In various cases, the part design server 102 can facilitate the computer-implemented methods 600, 700, and 800.

First, consider FIG. 6. In various embodiments, act 602 can include accessing, by a server device (e.g., via 122 of 102) associated with a manufacturing facility (e.g., one of 104), an historical database (e.g., 202) that contains cryptographic hashes (e.g., 402), spatial hashes (e.g., 404), anonymized feature vectors (e.g., 406), and manufacturing restriction indicators (e.g., 408) associated with prior part design files previously handled, fulfilled, or fabricated by the manufacturing facility.

In various aspects, act 604 can include accessing, by the server device (e.g., via 120 of 102) and from a client device, a request (e.g., 106) that a part be manufactured by the manufacturing facility. In various cases, the request can specify a client identifier (e.g., 108) and a part design file (e.g., 110), where the part design file can include a CAD geometry (e.g., 112) of the part and one or manufacturing specifications (e.g., 114) for the part.

In various instances, act 606 can include generating, by the server device (e.g., via 122 of 102), a cryptographic hash (e.g., 206), by feeding the part design file to a cryptographic hashing function.

In various cases, act 608 can include determining, by the server device (e.g., via 122 of 102), whether the cryptographic hash is already in the historical database (e.g., is already present in 402). If so (e.g., if the cryptographic hash is already in the historical database), the computer-implemented method 600 can proceed to act 712 of the computer-implemented method 700. If not (e.g., if the cryptographic hash is not already in the historical database), the computer-implemented method 600 can proceed to act 610.

In various aspects, act 610 can include generating, by the server device (e.g., via 122 of 102), a spatial hash (e.g., 208), by feeding the CAD geometry to a spatial hashing function. In various cases, the computer-implemented method 600 can then proceed to act 702 of the computer-implemented method 700.

Now, consider FIG. 7. In various embodiments, act 702 can include determining, by the server device (e.g., via 122 of 102), whether the spatial hash is already in the historical database (e.g., is already present in 404). If so (e.g., if the spatial hash is already in the historical database), the computer-implemented method 700 can proceed to act 712. If not (e.g., if the spatial hash is not already in the historical database), the computer-implemented method 700 can instead proceed to act 704.

In various aspects, act 704 can include extracting or generating, by the server device (e.g., via 122 of 102), an anonymized feature vector (e.g., 210), based on the CAD geometry.

In various instances, act 706 can include determining, by the server device (e.g., via 122 of 102), whether the anonymized feature vector is sufficiently similar to (e.g., is within any suitable threshold margin of similarity of) any of the anonymized feature vectors (e.g., 406) already in the historical database. If so (e.g., if the anonymized feature vector is sufficiently similar to any that is already in the historical database), then the computer-implemented method 700 can proceed to act 712. If not (e.g., if the anonymized feature vector is not sufficiently similar to any that is already in the historical database), then the computer-implemented method 700 can proceed to act 708 or to act 710.

In various cases, act 708 can include instructing, by the server device (e.g., via 124 of 102), the manufacturing facility to manufacture the part and to notify the client device that such manufacturing will be carried out.

In various aspects, act 710 can include updating, by the server device (e.g., via 124 of 102) and as applicable, the historical database with the cryptographic hash, with the spatial hash, with the anonymized feature vector, or with any asserted license that accompanies the client request (e.g., if not already present, the cryptographic hash 206, the spatial hash 208, or the anonymized feature vector 210 can be added to the historical database 202, along with any accompanying licenses).

In various instances, act 712 can include determining, by the server device (e.g., via 122 of 102), whether the cryptographic hash (e.g., if act 712 is arrived at from act 608), whether the spatial hash (e.g., if act 712 is arrived at from act 702), or whether the similar anonymized feature vectors (e.g., if act 712 is arrived at from act 706) are already restricted with respect to the client identifier. In various cases, this determination can involve identifying one or more manufacturing restriction indicators in the historical database that correspond to the cryptographic hash (e.g., if act 712 is arrived at from act 608), to the spatial hash (e.g., if act 712 is arrived at from act 702), or to the similar anonymized feature vectors (e.g., if act 712 is arrived at from act 706). If such one or more manufacturing restriction indicators specify no manufacturing restrictions at all, if they specify that the client identifier is a permitted entity, or if they fail to specify that the client identifier is a prohibited entity, then the computer-implemented method 700 can proceed to acts 708 or 710. On the other hand, if such one or more manufacturing restriction indicators specify that the client identifier is a prohibited entity, or if they fail to specify that the client identifier is a permitted entity, then the computer-implemented method 700 can proceed to any of acts 802-810 of the computer-implemented method 800.

Now, consider FIG. 8. In various embodiments, act 802 can include instructing, by the server device (e.g., via 124 of 102), the manufacturing facility to not manufacture the part and to notify the client device that such manufacturing will not be carried out.

In various aspects, if whatever manufacturing restrictions that have been identified as applicable to the part design file and to the client identifier are intellectual property rights (e.g., patents, trade secrets) exclusive to one or more owners, act 804 can include notifying, by the server device (e.g., via 124 of 102), computing devices of the one or more owners that the intellectual property rights have been tripped, invoked, activated, or otherwise enforced.

In various instances, if whatever manufacturing restrictions that have been identified as applicable to the part design file and to the client identifier are intellectual property rights (e.g., patents, trade secrets) exclusive to one or more owners, act 806 can include notifying, by the server device (e.g., via 124 of 102), the client device that the part can be manufactured by the manufacturing facility only upon payment of one or more royalty fees.

In various cases, if the request is accompanied by an asserted license, act 808 can include notifying, by the server device (e.g., via 124 of 102), the client device that the asserted license might be invalid.

In various aspects, if whatever manufacturing restrictions that have been identified as applicable to the part design file and to the client identifier are governmental security regulations (e.g., weapons regulations), act 810 can include notifying, by the server device (e.g., via 124 of 102), a computing device of a governmental entity that the governmental security regulations have been tripped, invoked, activated, or otherwise enforced.

Figure 9:
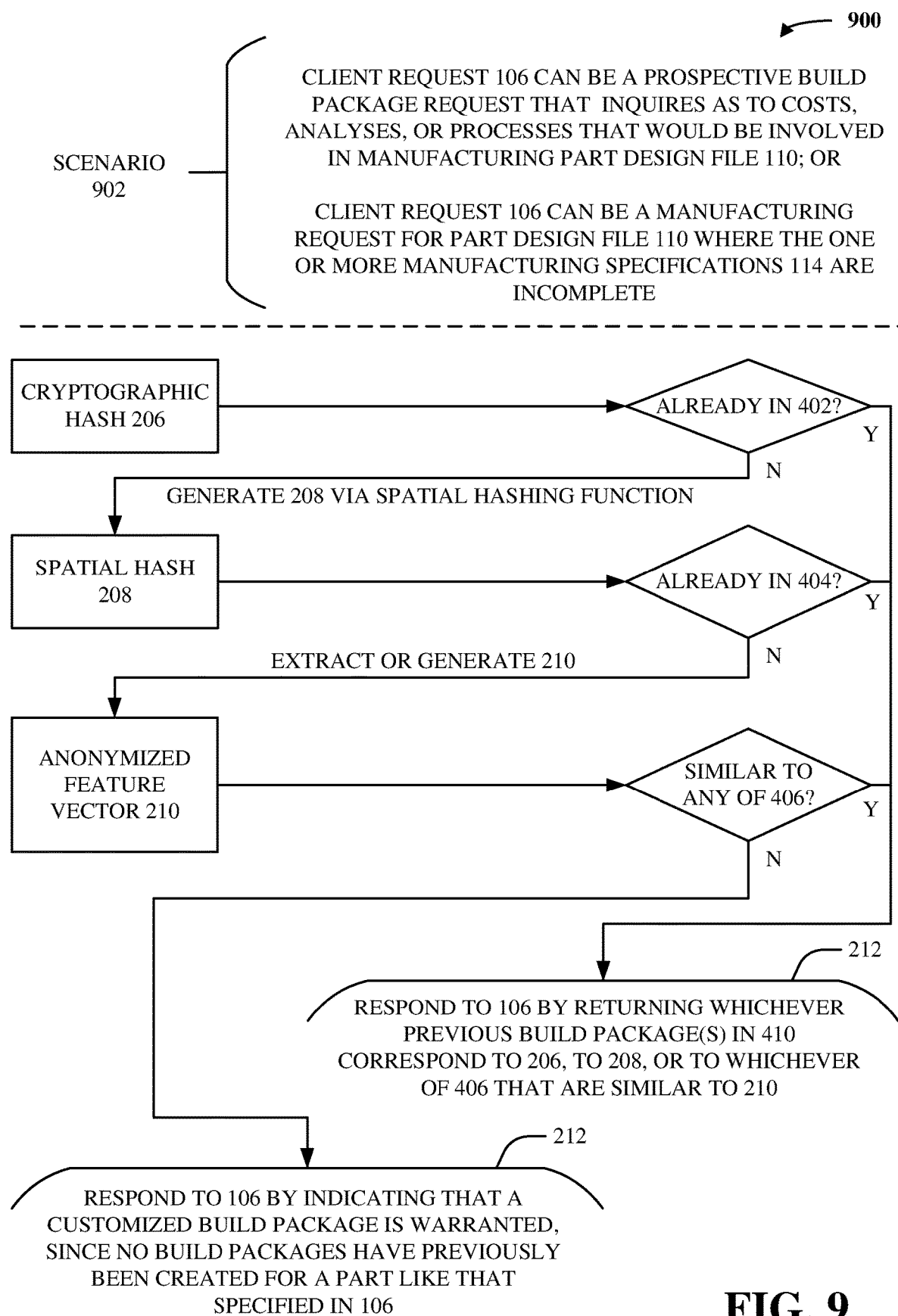
FIG. 9 illustrates an example, non-limiting block diagram showing how a multi-staged search of an historical database can be implemented to identify build packages that might be relevant to a given part design in accordance with one or more embodiments described herein.
Figure 10:
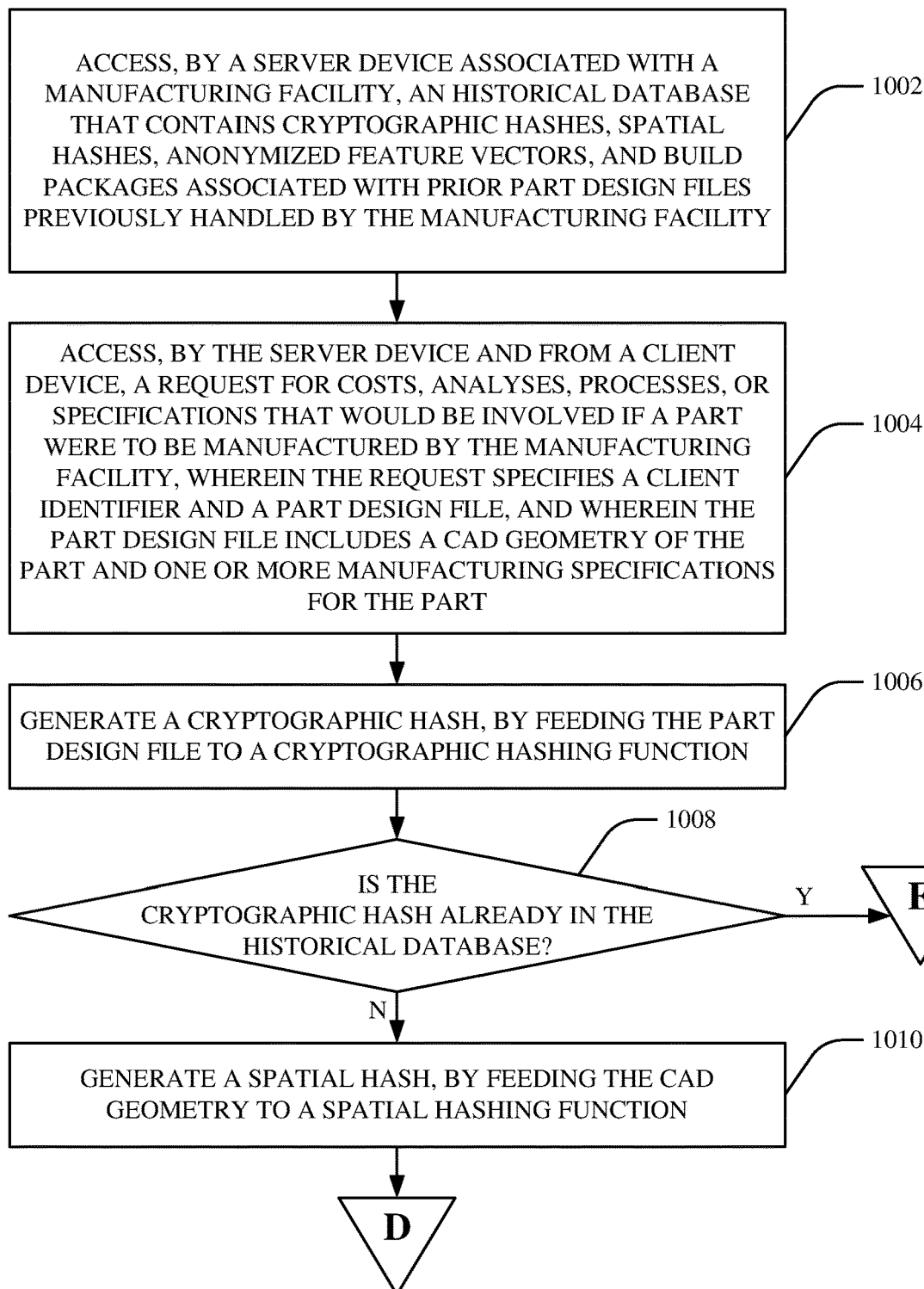
FIGS. 10-11 illustrate flow diagrams of example, non-limiting computer-implemented methods that facilitate a multi-staged search of an historical database so as to identify build packages that might be relevant to a given part design in accordance with one or more embodiments described herein.
Figure 11:
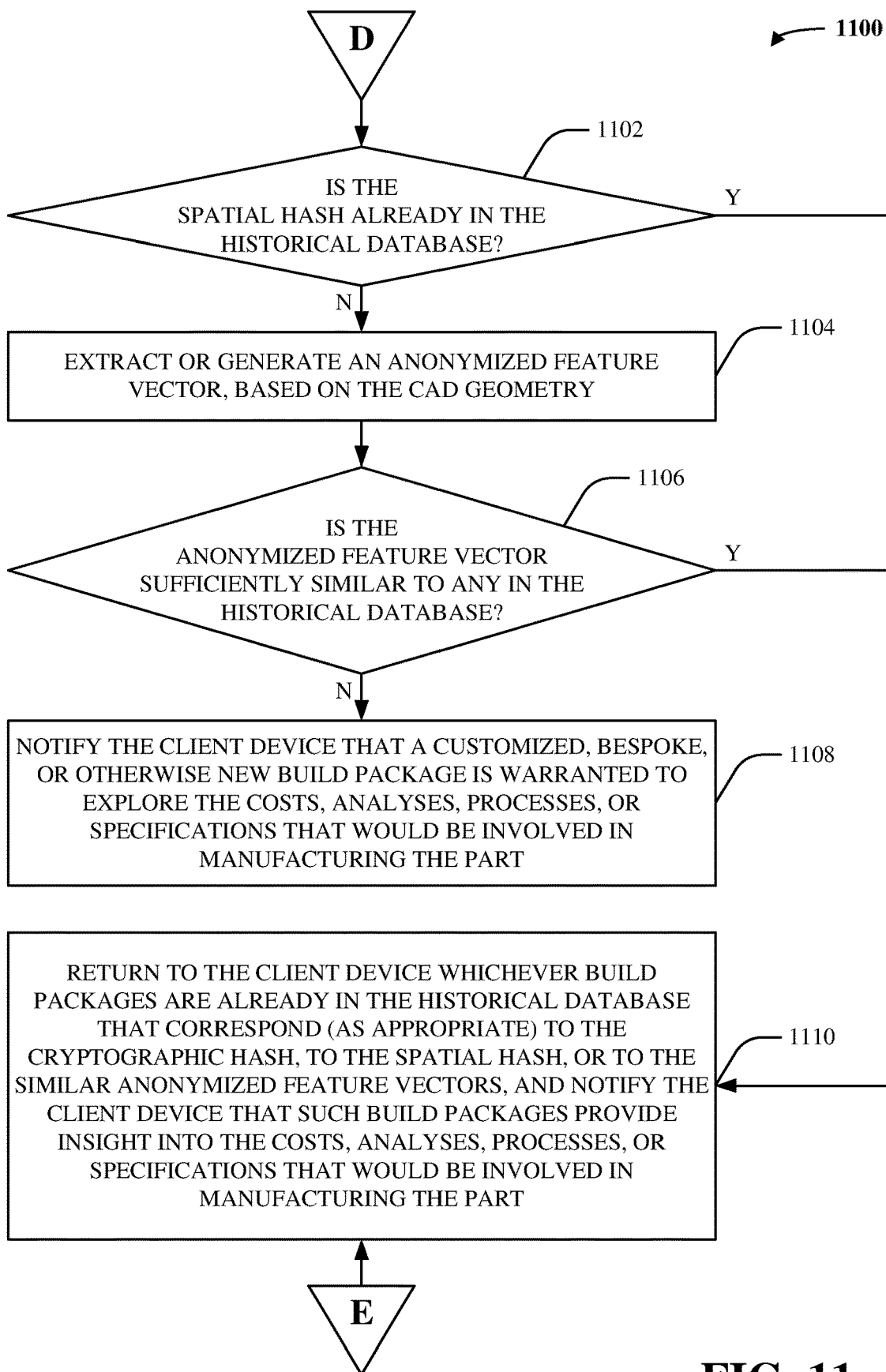

Now, consider FIGS. 9-11. FIG. 9 illustrates an example, non-limiting block diagram 900 showing how the multi-staged search 204 of the historical database 202 can be implemented to identify build packages (e.g., prior manufacturing costs, prior manufacturing processes) that might be relevant to the part design file 110 in accordance with one or more embodiments described herein.

In various embodiments, as shown, FIG. 9 can pertain to a scenario 902. In the scenario 902, the client request 106 can be considered or interpreted as a prospective build package request that asks which manufacturing costs, which engineering analyses, or which manufacturing processes would be involved in fabricating or fulfilling the part design file 110. Alternatively, in the scenario 902, the client request 106 can be considered or interpreted as a manufacturing or fabrication order for the part design file 110, where the one or more manufacturing specifications 114 can be incomplete or absent. In either of these cases, it can be desirable to determine whether or not any of the set of build packages 410 might be relevant or applicable to the part design file 110.

In various aspects, the search component 122 can facilitate the multi-staged search 204 as follows.

First, the search component 122 can generate the cryptographic hash 206, as described above. The search component 122 can, in various instances, then search through the historical database 202 to determine whether or not the cryptographic hash 206 is already present in the set of groups of prior cryptographic hashes 402. Suppose that the cryptographic hash 206 is already present in the set of groups of prior cryptographic hashes 402. In other words, suppose that the one or more manufacturing facilities 104 previously fulfilled the part design file 110 (e.g., one of the previous part design files fulfilled by the one or more manufacturing facilities 104 was equivalent or identical to the part design file 110). In such case, the search component 122 can identify whichever of the set of build packages 410 already corresponds to the cryptographic hash 206. In various instances, the one or more electronic actions 212 can include electronically sharing that identified build package with the client's computing device. Indeed, that identified build package can, in various aspects, be considered as indicating or specifying what manufacturing costs, what manufacturing processes, or what engineering analyses were implemented by the one or more manufacturing facilities 104 when the part design file 110 was previously fabricated or fulfilled. In other aspects, that identified build package can indicate or specify various manufacturing specifications (e.g., materials, tolerances, surface finishes) that were implemented by the one or more manufacturing facilities 104 when the part design file 110 was previously fabricated or fulfilled. In any case, the identified build package can be considered as at least partially helping to answer the client request 106 in the scenario 902.

Now, suppose instead that the cryptographic hash 206 is not already present in the set of groups of prior cryptographic hashes 402. In other words, suppose that the one or more manufacturing facilities 104 did not previously fulfill the part design file 110 (e.g., none of the previous part design files fulfilled by the one or more manufacturing facilities 104 were equivalent or identical to the part design file 110). In such case, the search component 122 can generate the spatial hash 208, as described above. The search component 122 can, in various instances, then search through the historical database 202 to determine whether or not the spatial hash 208 is already present in the set of prior spatial hashes 404. Suppose that the spatial hash 208 is already present in the set of prior spatial hashes 404. That is, suppose that the one or more manufacturing facilities 104 previously fulfilled a part design file having the CAD geometry 112 (e.g., one of the previous part design files fulfilled by the one or more manufacturing facilities 104 had a CAD geometry that was equivalent or identical to the CAD geometry 112). In such case, the search component 122 can identify whichever of the set of build packages 410 already corresponds to the spatial hash 208, and the one or more electronic actions 212 can include electronically sharing that identified build package with the client's computing device. Just as above, that identified build package can, in various aspects, be considered as indicating or specifying what manufacturing costs, what manufacturing processes, what engineering analyses, or what manufacturing specifications were implemented by the one or more manufacturing facilities 104 when whatever part design file having the CAD geometry 112 was previously fabricated or fulfilled. Thus, the identified build package can be considered as at least partially helping to answer the client request 106 in the scenario 902.

Next, suppose instead that the spatial hash 208 is not already present in the set of prior spatial hashes 404. In other words, suppose that the one or more manufacturing facilities 104 had not previously fulfilled any part design file having the CAD geometry 112. In such case, the search component 122 can generate the anonymized feature vector 210, as described above. The search component 122 can, in various instances, then search through the historical database 202 to determine whether or not the anonymized feature vector 210 is similar to any of the set of prior anonymized feature vectors 406. As mentioned above, the search component 122 can facilitate such similarity determination using any suitable similarity score metrics (e.g., using cosine similarity or Euclidean distance).

Suppose that at least one of the set of prior anonymized feature vectors 406 is within any suitable threshold margin of similarity (e.g., any suitable threshold cosine similarity or any suitable threshold Euclidean distance) of the anonymized feature vector 210. In such case, the search component 122 can conclude that the one or more manufacturing facilities 104 have previously fulfilled or fabricated at least one part design file having a CAD geometry that is similar to the CAD geometry 112. Accordingly, the search component 122 can identify whichever of the set of build packages 410 correspond to that at least one prior anonymized feature vector, and the one or more electronic actions 212 can include sharing those identified build packages with the client's computing device. Indeed, as above, those identified build packages can be considered as indicating or specifying what manufacturing costs, what manufacturing processes, what engineering analyses, or what manufacturing specifications were implemented by the one or more manufacturing facilities 104 when whatever part design files having CAD geometries similar to the CAD geometry 112 were previously fabricated or fulfilled. Thus, the identified build packages can be considered as at least partially helping to answer the client request 106 in the scenario 902.

Suppose instead that none of the set of prior anonymized feature vectors 406 is within the threshold margin of similarity of the anonymized feature vector 210. In such case, the search component 122 can conclude that the one or more manufacturing facilities 104 have not previously fulfilled or fabricated any part design file having a CAD geometry that is similar to the CAD geometry 112. Accordingly, it can be concluded that no build packages were previously made, prepared, or recorded for the part design file 110 or for anything similar to the part design file 110. Thus, the one or more electronic actions 212 can comprise notifying the client's computing device that no existing build packages are relevant or applicable to the part design file 110 and that a new or customized build package is warranted for the part design file 110.

Alternatively, rather than determining whether any of the set of prior anonymized feature vectors 406 are within any threshold margin of similarity to the anonymized feature vector 210, the search component 122 can instead identify one or more of the set of prior anonymized feature vectors 406 that are most similar to the anonymized feature vector 210 (e.g., can identify a most similar prior anonymized feature vector, or can identify the top x most similar prior anonymized feature vectors). The search component 122 can then identify whichever of the set of build packages 410 correspond to those one or more prior anonymized feature vectors, and the electronic actions 212 can comprise sharing those identified build packages with the client's computing device.

Again, note that the multi-staged search 204 can be considered as comprising a first stage pertaining to the cryptographic hash 206, a second stage pertaining to the spatial hash 208, and a third stage pertaining to the anonymized feature vector 210.

FIGS. 10-11 illustrate flow diagrams of example, non-limiting computer-implemented methods 1000 and 1100 that can facilitate a multi-staged search (e.g., 204) of an historical database (e.g., 202) so as to identify build packages (e.g., 410) that might be relevant to a given part design (e.g., 110) in accordance with one or more embodiments described herein. In various cases, the part design server 102 can facilitate the computer-implemented methods 1000 and 1100.

First, consider FIG. 1000. In various embodiments, act 1002 can include accessing, by a server device (e.g., via 122 of 102) associated with a manufacturing facility (e.g., one of 104), an historical database (e.g., 202) that contains cryptographic hashes (e.g., 402), spatial hashes (e.g., 404), anonymized feature vectors (e.g., 406), and build packages (e.g., 410) associated with prior part design files previously handled, fulfilled, or fabricated by the manufacturing facility.

In various aspects, act 1004 can include accessing, by the server device (e.g., via 120 of 102) and from a client device, a request (e.g., 106) for manufacturing costs, engineering analyses, manufacturing processes, or manufacturing specifications that would be involved if a part were to be manufactured by the manufacturing facility. In various cases, the request can specify a client identifier (e.g., 108) and a part design file (e.g., 110), where the part design file can include a CAD geometry (e.g., 112) of the part and one or manufacturing specifications (e.g., 114) for the part. Note that, in some aspects, the one or more manufacturing specifications in the part design file can be incomplete, hence the request for additional manufacturing specifications.

In various instances, act 1006 can include generating, by the server device (e.g., via 122 of 102), a cryptographic hash (e.g., 206), by feeding the part design file to a cryptographic hashing function.

In various cases, act 1008 can include determining, by the server device (e.g., via 122 of 102), whether the cryptographic hash is already in the historical database (e.g., is already present in 402). If so (e.g., if the cryptographic hash is already in the historical database), the computer-implemented method 1000 can proceed to act 1110 of the computer-implemented method 1100. If not (e.g., if the cryptographic hash is not already in the historical database), the computer-implemented method 1000 can proceed to act 1010.

In various aspects, act 1010 can include generating, by the server device (e.g., via 122 of 102), a spatial hash (e.g., 208), by feeding the CAD geometry to a spatial hashing function. In various cases, the computer-implemented method 1000 can then proceed to act 1102 of the computer-implemented method 1100.

Now, consider FIG. 11. In various embodiments, act 1102 can include determining, by the server device (e.g., via 122 of 102), whether the spatial hash is already in the historical database (e.g., is already present in 404). If so (e.g., if the spatial hash is already in the historical database), the computer-implemented method 1100 can proceed to act 1110. If not (e.g., if the spatial hash is not already in the historical database), the computer-implemented method 1100 can instead proceed to act 1104.

In various aspects, act 1104 can include extracting or generating, by the server device (e.g., via 122 of 102), an anonymized feature vector (e.g., 210), based on the CAD geometry.

In various instances, act 1106 can include determining, by the server device (e.g., via 122 of 102), whether the anonymized feature vector is sufficiently similar to (e.g., is within any suitable threshold margin of similarity of) any of the anonymized feature vectors (e.g., 406) already in the historical database. If so (e.g., if the anonymized feature vector is sufficiently similar to any that is already in the historical database), then the computer-implemented method 1100 can proceed to act 1110. If not (e.g., if the anonymized feature vector is not sufficiently similar to any that is already in the historical database), then the computer-implemented method 1100 can instead proceed to act 1108.

In various cases, act 1108 can include notifying, by the server device (e.g., via 124 of 102), the client device that nothing similar to the part has previously been fabricated or fulfilled by the manufacturing facility, and thus that a customized, bespoke, or otherwise new build package is warranted to explore what manufacturing costs, what engineering analyses, what manufacturing processes, or what manufacturing specifications would be involved in manufacturing the part.

In various instances, act 1110 can include returning, by the server device (e.g., via 124 of 102), whichever build packages (e.g., in 410) are already in the historical database that correspond to the cryptographic hash (e.g., if act 1110 is arrived at from act 1008), to the spatial hash (e.g., if act 1110 is arrived at from act 1102), or to the similar anonymized feature vectors (e.g., if act 1110 is arrived at from act 1106). This can further include notifying, by the server device (e.g., via 124 of 102), that such build packages were prepared for the part or for something similar to the part, and that such build packages can thus provide insight into what manufacturing costs, what engineering analyses, what manufacturing processes, or what manufacturing specifications would be involved in manufacturing the part.

Figure 12:
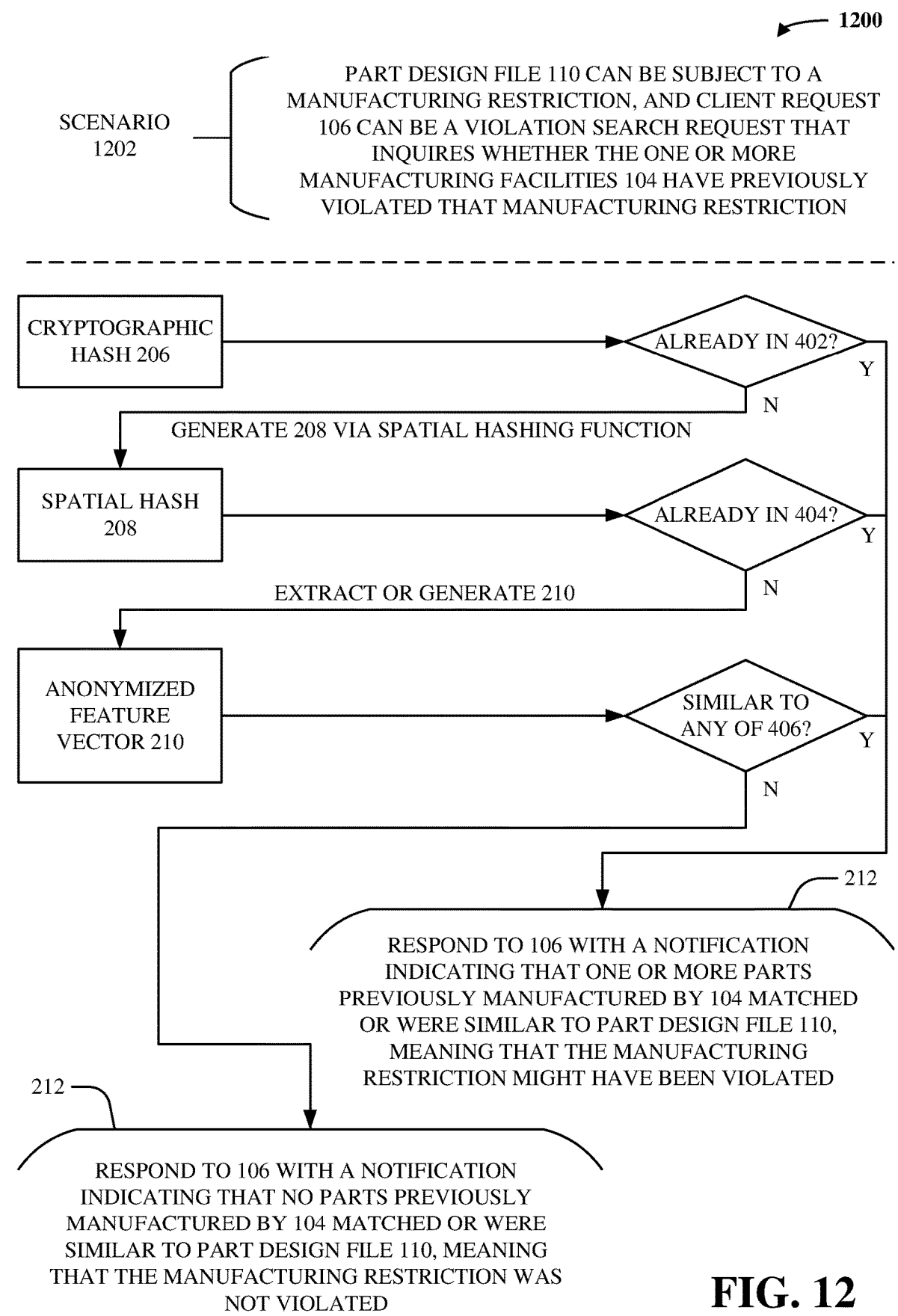
FIG. 12 illustrates an example, non-limiting block diagram showing how a multi-staged search of an historical database can be implemented to determine whether or not a restricted part design has been previously manufactured in accordance with one or more embodiments described herein.
Figure 13:
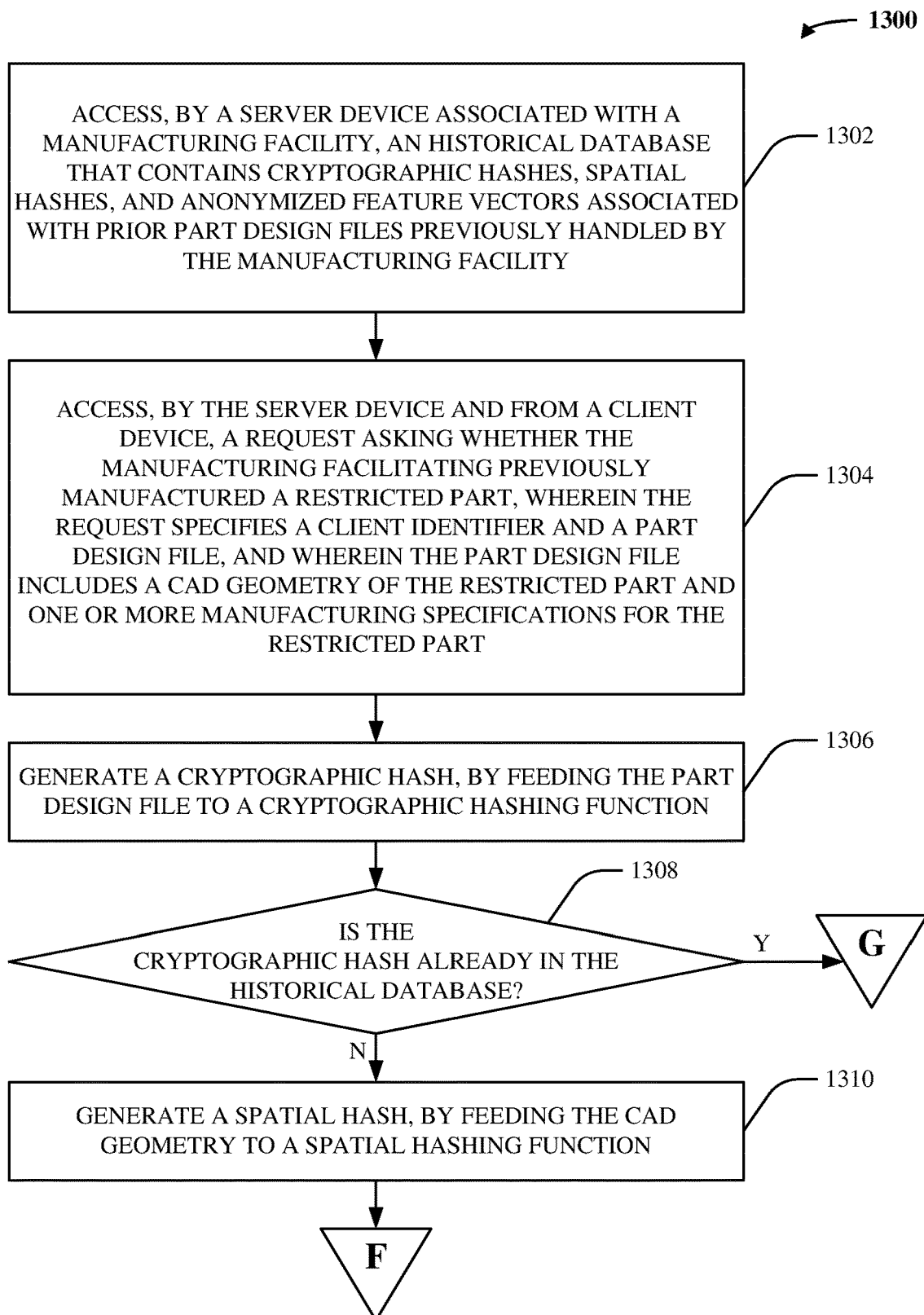
FIGS. 13-14 illustrate flow diagrams of example, non-limiting computer-implemented methods that facilitate a multi-staged search of an historical database so as to determine whether or not a restricted part design has been previously manufactured in accordance with one or more embodiments described herein.
Figure 14:
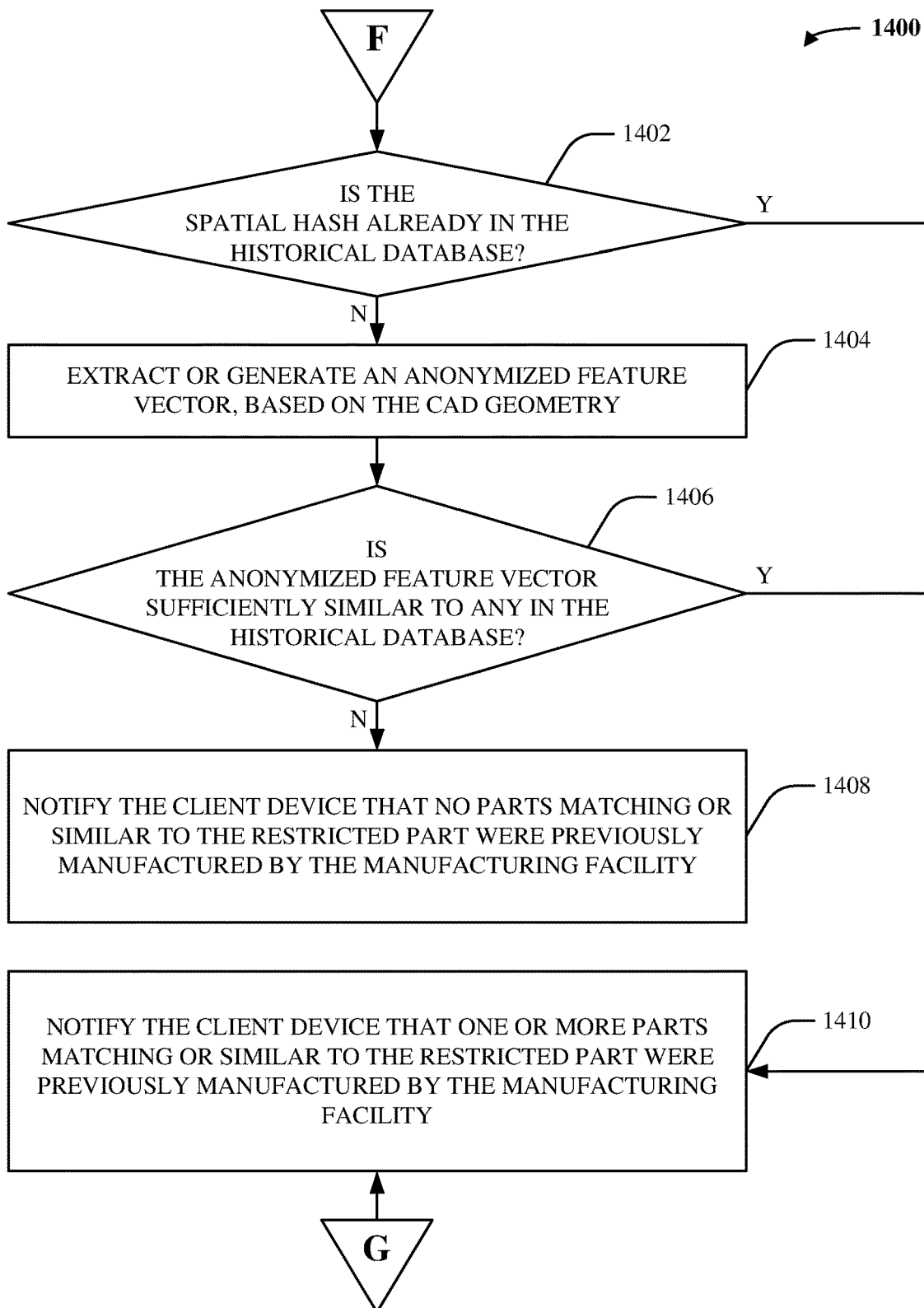

Now, consider FIGS. 12-14. FIG. 12 illustrates an example, non-limiting block diagram 1200 showing how the multi-staged search 204 of the historical database 202 can be implemented to determine whether or not the part design file 110, which can be known to be restricted, has been previously manufactured in accordance with one or more embodiments described herein.

In various embodiments, as shown, FIG. 12 can pertain to a scenario 1202. In the scenario 1202, the part design file 110 can be known or deemed to be subject to a manufacturing restriction (e.g., intellectual property restriction, governmental security restriction), and the client request 106 can be considered or interpreted as a violation search request that retrospectively asks whether the one or more manufacturing facilities 104 have previously violated that manufacturing restriction. Thus, it can be desirable to determine whether or not any of the part design files previously encountered by the one or more manufacturing facilities 104 matched or were similar to the part design file 110.

In various aspects, the search component 122 can facilitate the multi-staged search 204 as follows.

First, the search component 122 can generate the cryptographic hash 206, as described above. The search component 122 can, in various instances, then search through the historical database 202 to determine whether or not the cryptographic hash 206 is already present in the set of groups of prior cryptographic hashes 402. Suppose that the cryptographic hash 206 is already present in the set of groups of prior cryptographic hashes 402. In other words, suppose that the one or more manufacturing facilities 104 previously fulfilled the part design file 110 (e.g., one of the previous part design files fulfilled by the one or more manufacturing facilities 104 was equivalent or identical to the part design file 110). In such case, the one or more electronic actions 212 can include notifying the client's computing device that the one or more manufacturing facilities 104 previously fabricated the part design file 110, meaning that the manufacturing restriction can have been violated or infringed.

Now, suppose instead that the cryptographic hash 206 is not already present in the set of groups of prior cryptographic hashes 402. In other words, suppose that the one or more manufacturing facilities 104 did not previously fulfill the part design file 110 (e.g., none of the previous part design files fulfilled by the one or more manufacturing facilities 104 were equivalent or identical to the part design file 110). In such case, the search component 122 can generate the spatial hash 208, as described above. The search component 122 can, in various instances, then search through the historical database 202 to determine whether or not the spatial hash 208 is already present in the set of prior spatial hashes 404. Suppose that the spatial hash 208 is already present in the set of prior spatial hashes 404. That is, suppose that the one or more manufacturing facilities 104 previously fulfilled a part design file having the CAD geometry 112 (e.g., one of the previous part design files fulfilled by the one or more manufacturing facilities 104 had a CAD geometry that was equivalent or identical to the CAD geometry 112). In such case, the one or more electronic actions 212 can include notifying the client's computing device that the one or more manufacturing facilities 104 previously fabricated a part design file having the CAD geometry 112, meaning that the manufacturing restriction can have been violated or infringed.

Next, suppose instead that the spatial hash 208 is not already present in the set of prior spatial hashes 404. In other words, suppose that the one or more manufacturing facilities 104 had not previously fulfilled any part design file having the CAD geometry 112. In such case, the search component 122 can generate the anonymized feature vector 210, as described above. The search component 122 can, in various instances, then search through the historical database 202 to determine whether or not the anonymized feature vector 210 is similar to any of the set of prior anonymized feature vectors 406. As mentioned above, the search component 122 can facilitate such similarity determination using any suitable similarity score metrics (e.g., using cosine similarity or Euclidean distance or any suitable weighted technique).

Suppose that at least one of the set of prior anonymized feature vectors 406 is within any suitable threshold margin of similarity (e.g., any suitable threshold cosine similarity or any suitable threshold Euclidean distance) of the anonymized feature vector 210. In such case, the one or more electronic actions 212 can include notifying the client's computing device that the one or more manufacturing facilities 104 previously fabricated a part design file having a CAD geometry that was similar to the CAD geometry 112, meaning that the manufacturing restriction can have been violated or infringed.

Suppose instead that none of the set of prior anonymized feature vectors 406 is within the threshold margin of similarity of the anonymized feature vector 210. In such case, the one or more electronic actions 212 can include notifying the client's computing device that the one or more manufacturing facilities 104 have not previously fabricated the part design file 110 or anything similar to the part design file 110, meaning that the manufacturing restriction can have been not violated or infringed.

Once again, note that the multi-staged search 204 can be considered as comprising a first stage pertaining to the cryptographic hash 206, a second stage pertaining to the spatial hash 208, and a third stage pertaining to the anonymized feature vector 210.

FIGS. 13-14 illustrate flow diagrams of example, non-limiting computer-implemented methods 1300 and 1400 that can facilitate a multi-staged search (e.g., 204) of an historical database (e.g., 202) so as to determine whether or not a restricted part design (e.g., 110) has been previously manufactured in accordance with one or more embodiments described herein. In various cases, the part design server 102 can facilitate the computer-implemented methods 1300 and 1400.

First, consider FIG. 1300. In various embodiments, act 1302 can include accessing, by a server device (e.g., via 122 of 102) associated with a manufacturing facility (e.g., one of 104), an historical database (e.g., 202) that contains cryptographic hashes (e.g., 402), spatial hashes (e.g., 404), and anonymized feature vectors (e.g., 406) associated with prior part design files previously handled, fulfilled, or fabricated by the manufacturing facility.

In various aspects, act 1304 can include accessing, by the server device (e.g., via 120 of 102) and from a client device, a request (e.g., 106) asking whether the manufacturing facility previously manufactured a restricted part. In various cases, the request can specify a client identifier (e.g., 108) and a part design file (e.g., 110), where the part design file can include a CAD geometry (e.g., 112) of the restricted part and one or manufacturing specifications (e.g., 114) for the restricted part.

In various instances, act 1306 can include generating, by the server device (e.g., via 122 of 102), a cryptographic hash (e.g., 206), by feeding the part design file to a cryptographic hashing function.

In various cases, act 1308 can include determining, by the server device (e.g., via 122 of 102), whether the cryptographic hash is already in the historical database (e.g., is already present in 402). If so (e.g., if the cryptographic hash is already in the historical database), the computer-implemented method 1300 can proceed to act 1410 of the computer-implemented method 1400. If not (e.g., if the cryptographic hash is not already in the historical database), the computer-implemented method 1300 can proceed to act 1310.

In various aspects, act 1310 can include generating, by the server device (e.g., via 122 of 102), a spatial hash (e.g., 208), by feeding the CAD geometry to a spatial hashing function. In various cases, the computer-implemented method 1300 can then proceed to act 1402 of the computer-implemented method 1400.

Now, consider FIG. 14. In various embodiments, act 1402 can include determining, by the server device (e.g., via 122 of 102), whether the spatial hash is already in the historical database (e.g., is already present in 404). If so (e.g., if the spatial hash is already in the historical database), the computer-implemented method 1400 can proceed to act 1410. If not (e.g., if the spatial hash is not already in the historical database), the computer-implemented method 1400 can instead proceed to act 1404.

In various aspects, act 1404 can include extracting or generating, by the server device (e.g., via 122 of 102), an anonymized feature vector (e.g., 210), based on the CAD geometry.

In various instances, act 1406 can include determining, by the server device (e.g., via 122 of 102), whether the anonymized feature vector is sufficiently similar to (e.g., is within any suitable threshold margin of similarity of) any of the anonymized feature vectors (e.g., 406) already in the historical database. If so (e.g., if the anonymized feature vector is sufficiently similar to any that is already in the historical database), then the computer-implemented method 1400 can proceed to act 1410. If not (e.g., if the anonymized feature vector is not sufficiently similar to any that is already in the historical database), then the computer-implemented method 1400 can instead proceed to act 1408.

In various cases, act 1408 can include notifying, by the server device (e.g., via 124 of 102), the client device that no parts matching or similar to the restricted part were previously manufactured by the manufacturing facility.

In various instances, act 1410 can include notifying, by the server device (e.g., via 124 of 102), the client device that one or more parts matching or similar to the restricted part were previously manufactured by the manufacturing facility.

Figure 15:
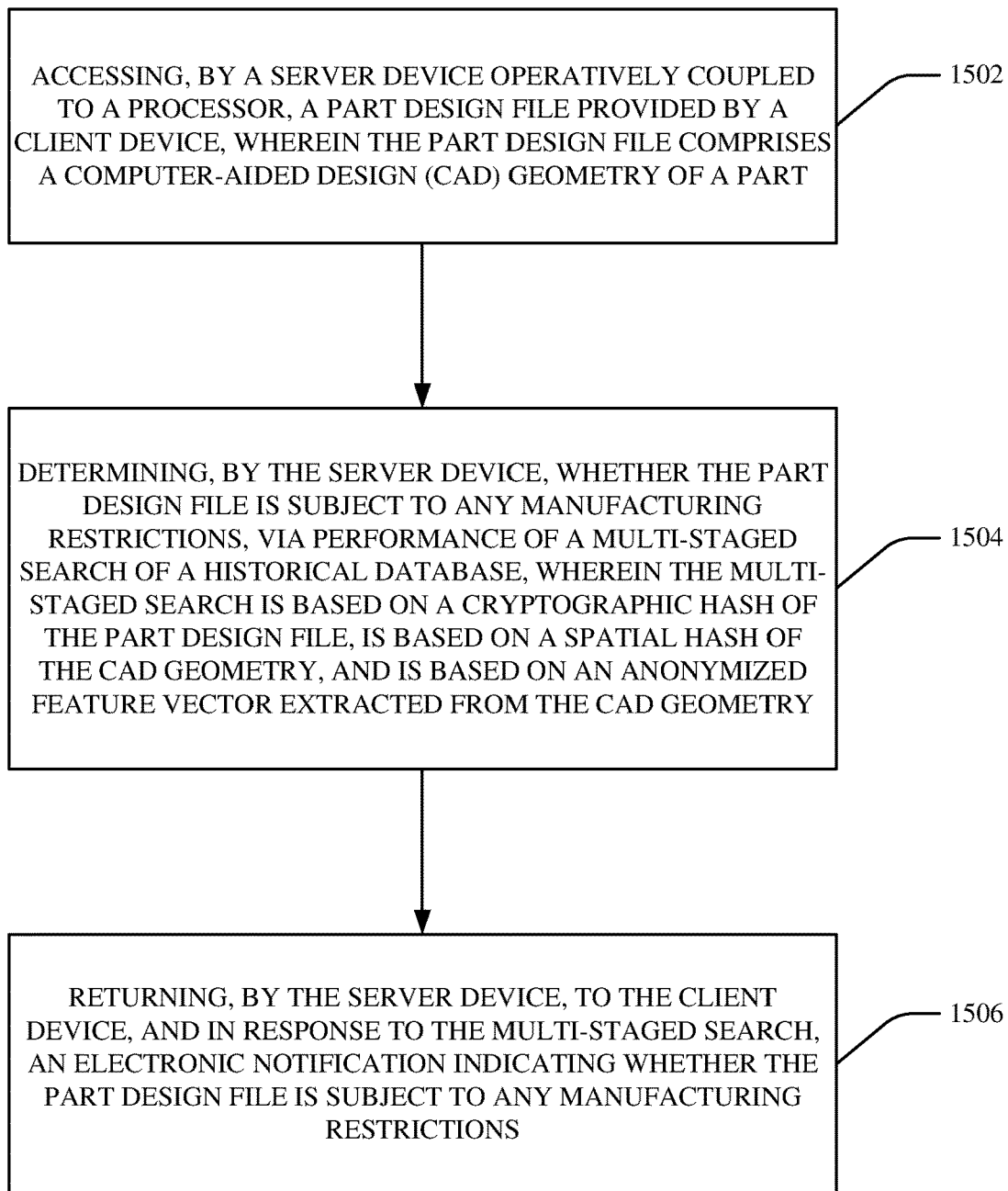
FIGS. 15-17 illustrate flow diagrams of example, non-limiting computer-implemented methods that facilitate de-identified search of part designs in accordance with one or more embodiments described herein.
Figure 16:
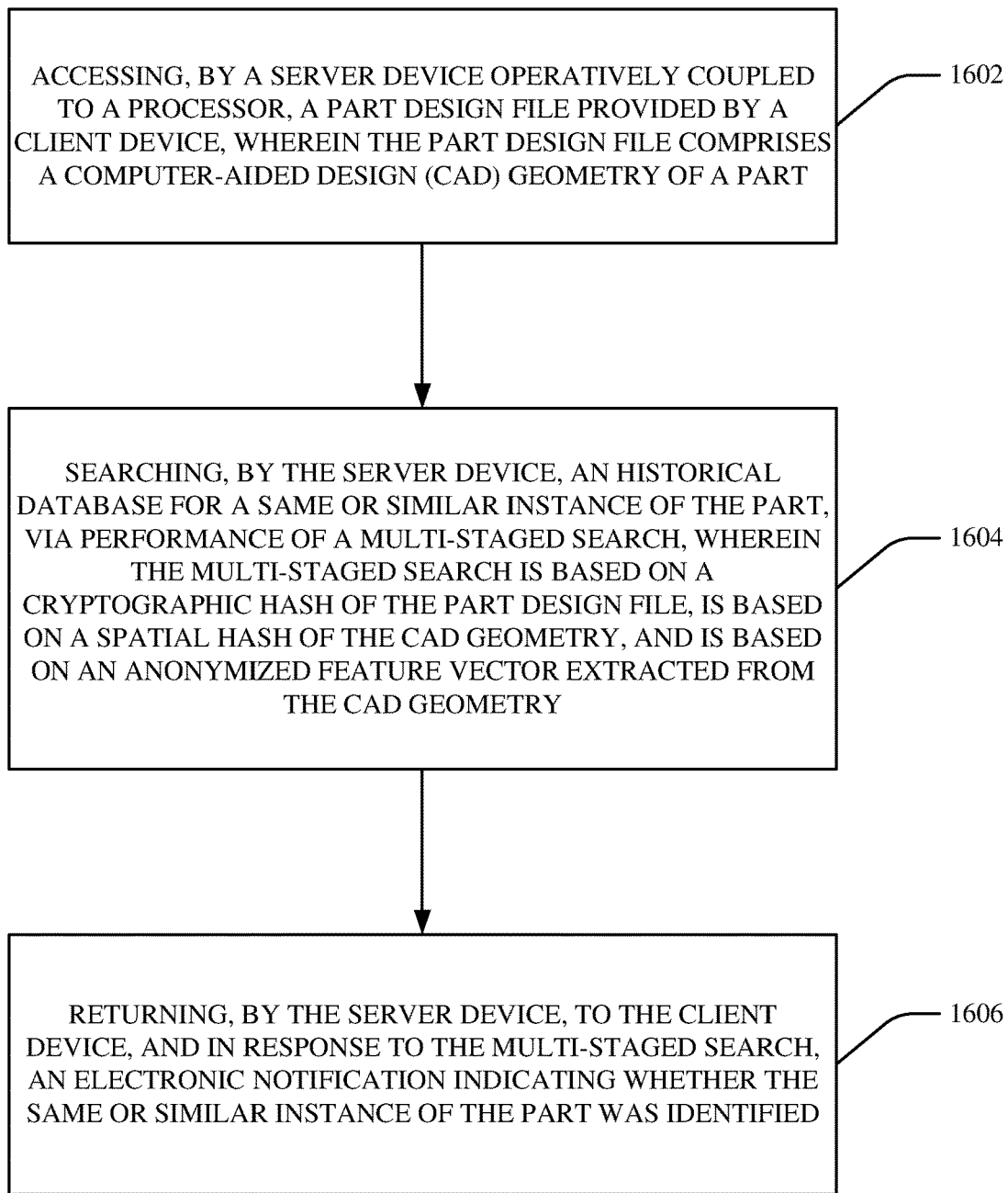
Figure 17:
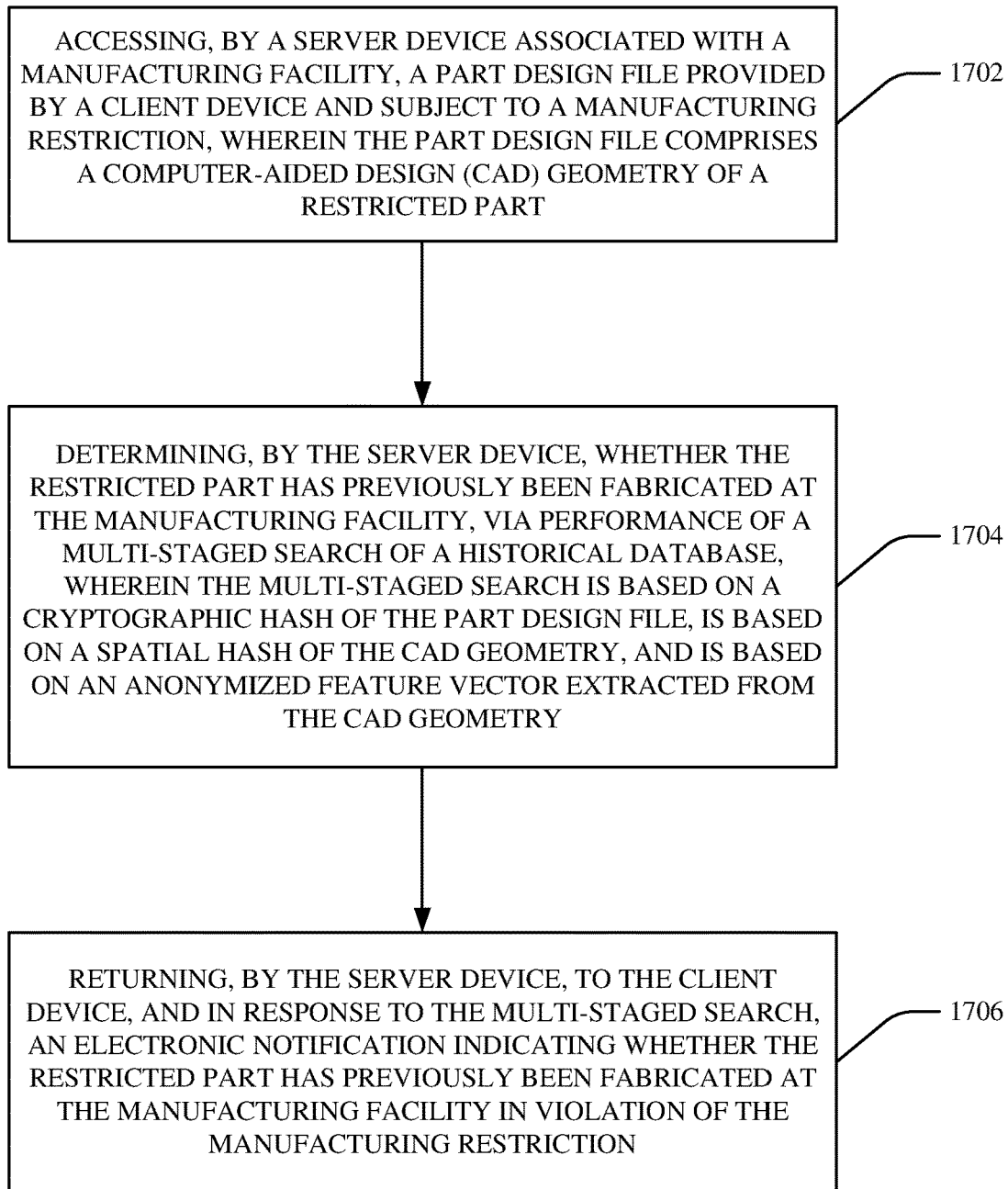

FIGS. 15-17 illustrate flow diagrams of example, non-limiting computer-implemented methods 1500, 1600, and 1700 that can facilitate de-identified search of part designs in accordance with one or more embodiments described herein.

First, consider FIG. 15. In various embodiments, act 1502 can include accessing, by a server device (e.g., via 120 of 102) operatively coupled to a processor (e.g., 116), a part design file (e.g., 110) provided by a client device, wherein the part design file comprises a computer-aided design (CAD) geometry (e.g., 112) of a part.

In various aspects, act 1504 can include determining, by the server device (e.g., via 122 of 102), whether the part design file is subject to any manufacturing restrictions (e.g., indicated by 408), via performance of a multi-staged search (e.g., 204) of an historical database (e.g., 202). In various cases, the multi-staged search can be based on a cryptographic hash (e.g., 206) of the part design file, can be based on a spatial hash (e.g., 208) of the CAD geometry, and can be based on an anonymized feature vector (e.g., 210) extracted from the CAD geometry.

In various instances, act 1506 can include returning, by the server device (e.g., via 124 of 102), to the client device, and in response to the multi-staged search, an electronic notification (e.g., one of 212) indicating whether the part design file is subject to any manufacturing restrictions.

Although not explicitly shown in FIG. 15, the server device can determine that the part design file is subject to at least one manufacturing restriction, wherein the at least one manufacturing restriction is an exclusive intellectual property restriction corresponding to an owner, and the computer-implemented method 1500 can further comprise: transmitting, by the server device (e.g., via 124 of 102) and to a computing device associated with the owner, another electronic notification (e.g., one of 212) indicating that the exclusive intellectual property restriction has been triggered. In some aspects, the server device can be associated with a manufacturing facility (e.g., one of 104), and the computer-implemented method 1500 can further comprise: flagging, by the server device (e.g., via 124 of 102), the part design file as not permissible for manufacturing at the manufacturing facility. In other aspects, the server device can be associated with a manufacturing facility (e.g., one of 104), and the computer-implemented method 1500 can further comprise: scheduling, by the server device (e.g., via 124 of 102) and in response to payment of a royalty fee, the part design file for manufacturing at the manufacturing facility.

Although not explicitly shown in FIG. 15, the server device can determine that the part design file is subject to at least one manufacturing restriction, wherein the at least one manufacturing restriction can be a governmental security restriction corresponding to a governmental entity, and the computer-implemented method 1500 can further comprise: transmitting, by the server device (e.g., via 124 of 102) and to a computing device associated with the governmental entity, another electronic notification (e.g., one of 212) indicating that the governmental security restriction has been triggered. In various cases, the server device can be associated with a manufacturing facility (e.g., one of 104), and the computer-implemented method 1500 can further comprise: flagging, by the server device (e.g., via 124 of 102), the part design file as not permissible for manufacturing at the manufacturing facility.

Although not explicitly shown in FIG. 15, the server device can be associated with a manufacturing facility (e.g., one of 104), the server device can determine that the part design file is subject to no manufacturing restrictions, and the computer-implemented method 1500 can further comprise: scheduling, by the server device (e.g., via 124 of 102), the part design file for manufacturing at the manufacturing facility.

Although not explicitly shown in FIG. 15, the server device can determine that the part design file is subject to no manufacturing restrictions, the client device can assert a license in conjunction with the part design file, and the computer-implemented method 1500 can further comprise: associating, by the server device (e.g., via 122 or 124 of 102) and within the historical database, the license with the cryptographic hash, with the spatial hash, and with the anonymized feature vector.

Now, consider FIG. 16. In various embodiments, act 1602 can include accessing, by a server device (e.g., via 120 of 102) operatively coupled to a processor (e.g., 116), a part design file (e.g., 110) provided by a client device, wherein the part design file comprises a computer-aided design (CAD) geometry (e.g., 112) of a part.

In various aspects, act 1604 can include searching, by the server device (e.g., via 122 of 102), an historical database (e.g., 202) for a same or similar instance of the part, via performance of a multi-staged search (e.g., 204). In various cases, the multi-staged search can be based on a cryptographic hash (e.g., 206) of the part design file, can be based on a spatial hash (e.g., 208) of the CAD geometry, and can be based on an anonymized feature vector (e.g., 210) extracted from the CAD geometry.

In various instances, act 1606 can include returning, by the server device (e.g., via 124 of 102), to the client device, and in response to the multi-staged search, an electronic notification (e.g., one of 212) indicating whether the same or similar instance of the part was identified.

Although not explicitly shown in FIG. 16, the historical database can comprise: a set of groups of prior cryptographic hashes (e.g., 402) generated from previous part design files; a set of prior spatial hashes (e.g., 404) generated from CAD geometries of the previous part design files and that respectively correspond to the set of groups of prior cryptographic hashes; a set of prior anonymized feature vectors (e.g., 406) extracted from the CAD geometries of the previous part design files and that respectively correspond to the set of prior spatial hashes; and a set of build packages (e.g., 410) that specify how or at what costs the previous part design files were manufactured and that respectively correspond to the set of anonymized feature vectors.

Although not explicitly shown in FIG. 16, the multi-staged search can comprise: generating, by the server device (e.g., via 122 of 102), the cryptographic hash by feeding the part design file to a cryptographic hashing function; and determining, by the server device (e.g., via 122 of 102), whether or not the cryptographic hash is already present in the set of groups of prior cryptographic hashes. In response to a determination that the cryptographic hash is already present in the set of groups of prior cryptographic hashes, the electronic notification can include whichever of the set of build packages corresponds to the cryptographic hash.

Although not explicitly shown in FIG. 16, the multi-staged search can comprise: generating, by the server device (e.g., via 122 of 102) and in response to a determination that the cryptographic hash is not already present in the set of groups of prior cryptographic hashes, the spatial hash by feeding the CAD geometry to a spatial hashing function; and determining, by the server device (e.g., via 122 of 102), whether or not the spatial hash is already present in the set of prior spatial hashes. In response to a determination that the spatial hash is already present in the set of prior spatial hashes, the electronic notification includes whichever of the set of build packages corresponds to the spatial hash.

Although not explicitly shown in FIG. 16, the multi-staged search can comprise: extracting, by the server device (e.g., via 122 of 102) and in response to a determination that the spatial hash is not already present in the set of prior spatial hashes, the anonymized feature vector by reading the CAD geometry or by passing the CAD geometry to a machine learning model; and identifying, by the server device (e.g., via 122 of 102) and from the set of prior anonymized feature vectors, a prior anonymized feature vector that has a highest similarity with the anonymized feature vector. In various cases, the electronic notification can include whichever of the set of build packages corresponds to the prior anonymized feature vector.

Although not explicitly shown in FIG. 16, the multi-staged search can comprise: extracting, by the server device (e.g., via 122 of 102) and in response to a determination that the spatial hash is not already present in the set of prior spatial hashes, the anonymized feature vector by reading the CAD geometry or by passing the CAD geometry to a machine learning model; and identifying, by the server device (e.g., via 122 of 102) and from the set of prior anonymized feature vectors, multiple prior anonymized feature vectors that are within a threshold level of similarity of the anonymized feature vector. In various cases, the electronic notification can include whichever of the set of build packages correspond to the multiple prior anonymized feature vectors.

Although not explicitly shown in FIG. 16, the multi-staged search can comprise: extracting, by the server device (e.g., via 122 of 102) and in response to a determination that the spatial hash is not already present in the set of prior spatial hashes, the anonymized feature vector by reading the CAD geometry or by passing the CAD geometry to a machine learning model; and determining, by the server device (e.g., via 122 of 102), that none of the set of prior anonymized feature vectors is within a threshold level of similarity of the anonymized feature vector. In various cases, the electronic notification can indicate that no build package relevant to the part design file was identified.

Next, consider FIG. 17. In various embodiments, act 1702 can include accessing, by a server device (e.g., via 120 of 102) associated with a manufacturing facility (e.g., one of 104), a part design file (e.g., 110) provided by a client device and subject to a manufacturing restriction, wherein the part design file can comprise a computer-aided design (CAD) geometry (e.g., 112) of a restricted part.

In various aspects, act 1704 can include determining, by the server device (e.g., via 122 of 102), whether the restricted part has previously been fabricated at the manufacturing facility, via performance of a multi-staged search (e.g., 204) of an historical database (e.g., 202). In various cases, the multi-staged search can be based on a cryptographic hash (e.g., 206) of the part design file, can be based on a spatial hash (e.g., 208) of the CAD geometry, and can be based on an anonymized feature vector (e.g., 210) extracted from the CAD geometry.

In various instances, act 1706 can include returning, by the server device (e.g., via 124 of 102), to the client device, and in response to the multi-staged search, an electronic notification (e.g., one of 212) indicating whether the restricted part has previously been fabricated at the manufacturing facility in violation of the manufacturing restriction.

Although not explicitly shown in FIG. 17, the manufacturing restriction can be an intellectual property restriction exclusive to an owner, and the client device can be associated with the owner.

Although not explicitly shown in FIG. 17, the manufacturing restriction can be a governmental security restriction enforced by a governmental entity, and the client device can be associated with the governmental entity.

Although not explicitly shown in FIG. 17, the server device can determine that the part design file was previously fabricated at the manufacturing facility in violation of the manufacturing restriction.

Although the herein disclosure mainly describes various embodiments in which the search component 122 searches the historical database 202 for a prior anonymized feature vector (e.g., one of 406) that is within any suitable threshold margin of similarity to (e.g., that indicates same or similar sizes, shapes, or dimensions as) the anonymized feature vector 210, this is a mere non-limiting example for case of illustration and explanation. In various embodiments, the search component 122 can search the historical database 202 for a prior anonymized feature vector (e.g., one of 406) that has any suitable relationship whatsoever to the anonymized feature vector 210. As some non-limiting examples, the search component 122 can search for a prior anonymized feature vector having one or more numerical elements that: are greater than respective numerical elements of the anonymized feature vector 210 by any suitable threshold margin; are lesser than respective numerical elements of the anonymized feature vector 210 by any suitable threshold margin; are multiples of respective numerical elements of the anonymized feature vector 210; are factors of respective numerical elements of the anonymized feature vector 210; or have any suitable interrelationships (e.g., ratios or proportions) with each other. In other words, the search component 122 can be considered as being able to search through the historical database 202 for features having any desired relationships with themselves or with the features indicated by the anonymized feature vector 210.

As described herein, the one or more electronic actions 212 can, in some embodiments, include instructing the one or more manufacturing facilities 104 to fabricate or manufacture the part design file 110. In some cases, the one or more manufacturing facilities 104 can comprise a plurality of different manufacturing facilities. In such cases, the result component 124 can identify which specific manufacturing facility or facilities of that plurality can or should fabricate or manufacture the part design file 110. In various aspects, such identification can be based on the multi-staged search 204. In particular, as mentioned above, the multi-staged search 204 can return one or more build packages (e.g., from 410) that were implemented for previous part design files that were the same as, similar to, or otherwise related to the part design file 110, and those returned build packages can, in some instances, identify which specific manufacturing facilities previously fabricated or manufactured those previous part design files. Accordingly, in various cases, the result component 124 can instruct those specific manufacturing facilities to fabricate or manufacture the part design file 110.

Although the herein disclosure mainly describes various embodiments of a manufacturing restriction as being an intellectual property restriction (e.g., arising from patents or trade secrets) or as being a governmental security regulation, these are mere non-limiting examples for case of explanation. In various embodiments, a manufacturing restriction can be any other suitable type of restriction on the manufacturing or fabrication of a respective part or design whatsoever. As a non-limiting example, a manufacturing restriction can arise from any other type of legal source (e.g., a legally-binding contract or an internal company policy can prohibit a particular part or design from being fabricated or manufactured). As another non-limiting example, a manufacturing restriction can arise from material availabilities or manufacturing process availabilities (e.g., if one or more materials or manufacturing processes that are needed to fabricate a particular part or design are known to be currently unavailable, then fabrication or manufacturing of that particular part or design can be marked in the historical dataset 202 as being limited or restricted). As even another non-limiting example, a manufacturing restriction can arise from material costs or manufacturing process costs (e.g., if one or more materials or manufacturing processes that are needed to fabricate a particular part or design are known to cost more than a threshold level of expense, then fabrication or manufacturing of that particular part or design can be marked in the historical dataset 202 as being limited or restricted).

Furthermore, in some aspects, a manufacturing restriction can be location dependent (e.g., can vary with manufacturing location). As a non-limiting example, a manufacturing restriction indicator can specify that a particular manufacturing restriction applies in one or more first locations, regions, environments, or countries and can also specify that the particular manufacturing restriction does not apply in one or more second locations, regions, environments, or countries. In some aspects, such a location-dependent manufacturing restriction can arise due to how laws or regulations can vary or differ across geographic location (e.g., laws in one location might allow a specific part or design to be fabricated, while laws in another location might prohibit that specific part or design from being fabricated). In other aspects, such a location-dependent manufacturing restriction can arise due to how the availability of materials, manufacturing processes, or other manufacturing resources can vary or differ across geographic location (e.g., the materials, processes, or resources needed to fabricate a specific part or design might be available in one location but unavailable in another location). In yet other aspects, such a location-dependent manufacturing restriction can arise due to how the costs of materials, manufacturing processes, or other manufacturing resources can vary or differ across geographic location (e.g., the materials, processes, or resources needed to fabricate a specific part or design might be prohibitively expensive in one location but affordable in another location). In even other aspects, such a location-dependent manufacturing restriction can arise due to how physical or cyber security can vary or differ across geographic location (e.g., fabricating a specific part or design might be safe in a physical or cyber security sense in one location but unsafe in a physical or cyber security sense in another location). In still other aspects, such a location-dependent manufacturing restriction can arise due to how environmental conditions can vary or differ across geographic location (e.g., fabricating a specific part or design might be feasible in the weather or climate of one location but infeasible in the weather or climate of another location). Thus, in various embodiments, the client request 106 can identify not just the client identifier 108 and the part design file 110, but can also identify a desired location at which the part design file 110 is requested to be manufactured or fabricated, and the search component 122 can determine whether an identified manufacturing restriction is triggered by or otherwise applicable to that desired location.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 18:
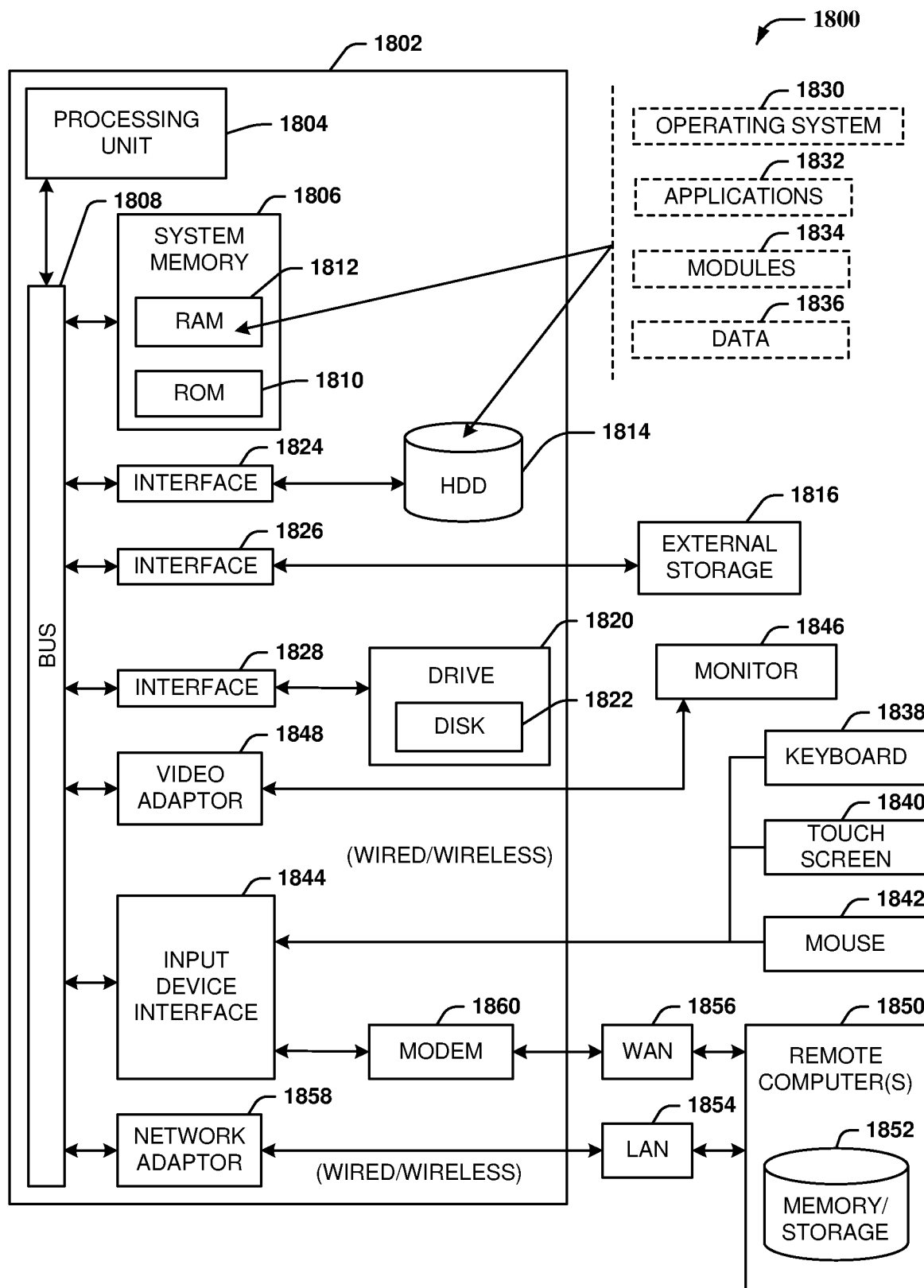
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that various aspects can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 19:
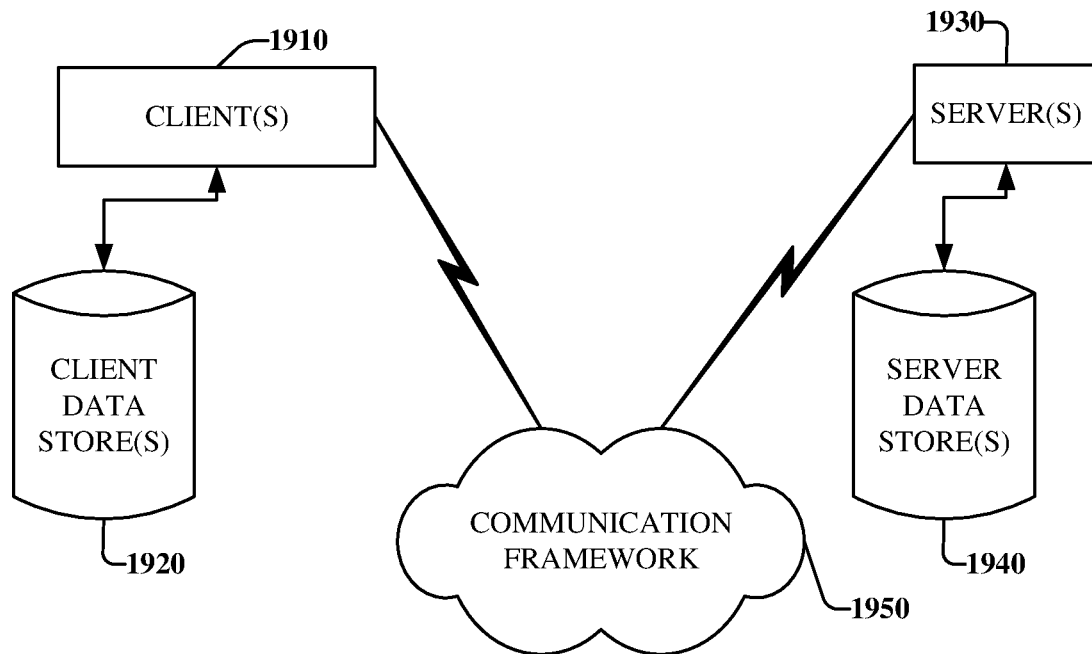
FIG. 19 illustrates an example networking environment operable to execute various implementations described herein.

FIG. 19 is a schematic block diagram of a sample computing environment 1900 with which the disclosed subject matter can interact. The sample computing environment 1900 includes one or more client(s) 1910. The client(s) 1910 can be hardware or software (e.g., threads, processes, computing devices). The sample computing environment 1900 also includes one or more server(s) 1930. The server(s) 1930 can also be hardware or software (e.g., threads, processes, computing devices). The servers 1930 can house threads to perform transformations by employing one or more embodiments as described herein, for example. One possible communication between a client 1910 and a server 1930 can be in the form of a data packet adapted to be transmitted between two or more computer processes. The sample computing environment 1900 includes a communication framework 1950 that can be employed to facilitate communications between the client(s) 1910 and the server(s) 1930. The client(s) 1910 are operably connected to one or more client data store(s) 1920 that can be employed to store information local to the client(s) 1910. Similarly, the server(s) 1930 are operably connected to one or more server data store(s) 1940 that can be employed to store information local to the servers 1930.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server device, comprising:
    a processor that executes computer-executable components stored in a non-transitory computer-readable memory, wherein the computer-executable components comprise:
        an access component that accesses a part design file provided by a client device, wherein the part design file comprises a computer-aided design (CAD) geometry of a part;
        a search component that searches an historical database for a same or similar instance of the part, via performance of a multi-staged search, wherein the multi-staged search is based on a cryptographic hash of the part design file, is based on a spatial hash of the CAD geometry, and is based on an anonymized feature vector extracted from the CAD geometry; and
        a result component that returns, to the client device and in response to the multi-staged search, an electronic notification indicating whether the same or similar instance of the part was identified.

2. The server device of claim 1, wherein the historical database comprises:
    a set of groups of prior cryptographic hashes generated from previous part design files;
    a set of prior spatial hashes generated from CAD geometries of the previous part design files and that respectively correspond to the set of groups of prior cryptographic hashes;
    a set of prior anonymized feature vectors extracted from the CAD geometries of the previous part design files and that respectively correspond to the set of prior spatial hashes; and
    a set of build packages that specify how or at what costs the previous part design files were manufactured and that respectively correspond to the set of anonymized feature vectors.

3. The server device of claim 2, wherein the search component:
    generates the cryptographic hash by feeding the part design file to a cryptographic hashing function; and
    determines whether or not the cryptographic hash is already present in the set of groups of prior cryptographic hashes; and
    wherein, in response to a determination that the cryptographic hash is already present in the set of groups of prior cryptographic hashes, the electronic notification includes whichever of the set of build packages corresponds to the cryptographic hash.

4. The server device of claim 3, wherein, in response to a determination that the cryptographic hash is not already present in the set of groups of prior cryptographic hashes, the search component:
    generates the spatial hash by feeding the CAD geometry to a spatial hashing function; and
    determines whether or not the spatial hash is already present in the set of prior spatial hashes; and
    wherein, in response to a determination that the spatial hash is already present in the set of prior spatial hashes, the electronic notification includes whichever of the set of build packages corresponds to the spatial hash.

5. The server device of claim 4, wherein, in response to a determination that the spatial hash is not already present in the set of prior spatial hashes, the search component:
    extracts the anonymized feature vector by reading the CAD geometry or by passing the CAD geometry to a machine learning model; and
    identifies, from the set of prior anonymized feature vectors, a prior anonymized feature vector that has a highest similarity with the anonymized feature vector; and
    wherein the electronic notification includes whichever of the set of build packages corresponds to the prior anonymized feature vector.

6. The server device of claim 4, wherein, in response to a determination that the spatial hash is not already present in the set of prior spatial hashes, the search component:
- extracts the anonymized feature vector by reading the CAD geometry or by passing the CAD geometry to a machine learning model; and
- identifies, from the set of prior anonymized feature vectors, multiple prior anonymized feature vectors that are within a threshold level of similarity of the anonymized feature vector; and
- wherein the electronic notification includes whichever of the set of build packages correspond to the multiple prior anonymized feature vectors.

7. The server device of claim 4, wherein, in response to a determination that the spatial hash is not already present in the set of prior spatial hashes, the search component:
- extracts the anonymized feature vector by reading the CAD geometry or by passing the CAD geometry to a machine learning model; and
- determines that none of the set of prior anonymized feature vectors is within a threshold level of similarity of the anonymized feature vector; and
- wherein the electronic notification indicates that no build package relevant to the part design file was identified.

8. A computer-implemented method, comprising:
- accessing, by a server device operatively coupled to a processor, a part design file provided by a client device, wherein the part design file comprises a computer-aided design (CAD) geometry of a part;
- searching, by the server device, an historical database for a same or similar instance of the part, via performance of a multi-staged search, wherein the multi-staged search is based on a cryptographic hash of the part design file, is based on a spatial hash of the CAD geometry, and is based on an anonymized feature vector extracted from the CAD geometry; and
- returning, by the server device, to the client device, and in response to the multi-staged search, an electronic notification indicating whether the same or similar instance of the part was identified.

9. The computer-implemented method of claim 8, wherein the historical database comprises:
- a set of groups of prior cryptographic hashes generated from previous part design files;
- a set of prior spatial hashes generated from CAD geometries of the previous part design files and that respectively correspond to the set of groups of prior cryptographic hashes;
- a set of prior anonymized feature vectors extracted from the CAD geometries of the previous part design files and that respectively correspond to the set of prior spatial hashes; and
- a set of build packages that specify how or at what costs the previous part design files were manufactured and that respectively correspond to the set of anonymized feature vectors.

10. The computer-implemented method of claim 9, wherein the multi-staged search comprises:
- generating, by the server device, the cryptographic hash by feeding the part design file to a cryptographic hashing function; and
- determining, by the server device, whether or not the cryptographic hash is already present in the set of groups of prior cryptographic hashes; and
- wherein, in response to a determination that the cryptographic hash is already present in the set of groups of prior cryptographic hashes, the electronic notification includes whichever of the set of build packages corresponds to the cryptographic hash.

11. The computer-implemented method of claim 10, wherein the multi-staged search comprises:
- generating, by the server device and in response to a determination that the cryptographic hash is not already present in the set of groups of prior cryptographic hashes, the spatial hash by feeding the CAD geometry to a spatial hashing function; and
- determining, by the server device, whether or not the spatial hash is already present in the set of prior spatial hashes; and
- wherein, in response to a determination that the spatial hash is already present in the set of prior spatial hashes, the electronic notification includes whichever of the set of build packages corresponds to the spatial hash.

12. The computer-implemented method of claim 11, wherein the multi-staged search comprises:
- extracting, by the server device and in response to a determination that the spatial hash is not already present in the set of prior spatial hashes, the anonymized feature vector by reading the CAD geometry or by passing the CAD geometry to a machine learning model; and
- identifying, by the server device and from the set of prior anonymized feature vectors, a prior anonymized feature vector that has a highest similarity with the anonymized feature vector; and
- wherein the electronic notification includes whichever of the set of build packages corresponds to the prior anonymized feature vector.

13. The computer-implemented method of claim 11, wherein the multi-staged search comprises:
- extracting, by the server device and in response to a determination that the spatial hash is not already present in the set of prior spatial hashes, the anonymized feature vector by reading the CAD geometry or by passing the CAD geometry to a machine learning model; and
- identifying, by the server device and from the set of prior anonymized feature vectors, multiple prior anonymized feature vectors that are within a threshold level of similarity of the anonymized feature vector; and
- wherein the electronic notification includes whichever of the set of build packages correspond to the multiple prior anonymized feature vectors.

14. The computer-implemented method of claim 11, wherein the multi-staged search comprises:
- extracting, by the server device and in response to a determination that the spatial hash is not already present in the set of prior spatial hashes, the anonymized feature vector by reading the CAD geometry or by passing the CAD geometry to a machine learning model; and
- determining, by the server device, that none of the set of prior anonymized feature vectors is within a threshold level of similarity of the anonymized feature vector; and
- wherein the electronic notification indicates that no build package relevant to the part design file was identified.

15. A computer program product for facilitating de-identified search of part designs, the computer program product comprising a non-transitory computer-readable memory having program instructions embodied therewith, the program instructions executable by a processor to cause the processor to:

access a part design file provided by a client device, wherein the part design file comprises a computer-aided design (CAD) geometry of a part;
search an historical database for a same or similar instance of the part, via performance of a multi-staged search, wherein the multi-staged search is based on a cryptographic hash of the part design file, is based on a spatial hash of the CAD geometry, and is based on an anonymized feature vector extracted from the CAD geometry; and
return, to the client device and in response to the multi-staged search, an electronic notification indicating whether the same or similar instance of the part was identified.

16. The computer program product of claim 15, wherein the historical database comprises:
a set of groups of prior cryptographic hashes generated from previous part design files;
a set of prior spatial hashes generated from CAD geometries of the previous part design files and that respectively correspond to the set of groups of prior cryptographic hashes;
a set of prior anonymized feature vectors extracted from the CAD geometries of the previous part design files and that respectively correspond to the set of prior spatial hashes; and
a set of build packages that specify how or at what costs the previous part design files were manufactured and that respectively correspond to the set of anonymized feature vectors.

17. The computer program product of claim 16, wherein the processor:
generates the cryptographic hash by feeding the part design file to a cryptographic hashing function; and
determines whether or not the cryptographic hash is already present in the set of groups of prior cryptographic hashes; and
wherein, in response to a determination that the cryptographic hash is already present in the set of groups of prior cryptographic hashes, the electronic notification includes whichever of the set of build packages corresponds to the cryptographic hash.

18. The computer program product of claim 17, wherein, in response to a determination that the cryptographic hash is not already present in the set of groups of prior cryptographic hashes, the processor:
generates the spatial hash by feeding the CAD geometry to a spatial hashing function; and
determines whether or not the spatial hash is already present in the set of prior spatial hashes; and
wherein, in response to a determination that the spatial hash is already present in the set of prior spatial hashes, the electronic notification includes whichever of the set of build packages corresponds to the spatial hash.

19. The computer program product of claim 18, wherein, in response to a determination that the spatial hash is not already present in the set of prior spatial hashes, the processor:
extracts the anonymized feature vector by reading the CAD geometry or by passing the CAD geometry to a machine learning model; and
identifies, from the set of prior anonymized feature vectors, a prior anonymized feature vector that has a highest similarity with the anonymized feature vector; and
wherein the electronic notification includes whichever of the set of build packages corresponds to the prior anonymized feature vector.

20. The computer program product of claim 18, wherein, in response to a determination that the spatial hash is not already present in the set of prior spatial hashes, the processor:
extracts the anonymized feature vector by reading the CAD geometry or by passing the CAD geometry to a machine learning model; and
identifies, from the set of prior anonymized feature vectors, multiple prior anonymized feature vectors that are within a threshold level of similarity of the anonymized feature vector; and
wherein the electronic notification includes whichever of the set of build packages correspond to the multiple prior anonymized feature vectors.

* * * * *